US006682217B1

United States Patent
Joffe

(10) Patent No.: US 6,682,217 B1
(45) Date of Patent: Jan. 27, 2004

(54) MAGNETICALLY STABILIZED PRECISION TABLE AND LOAD-CARRYING BEARINGS

(76) Inventor: Benjamin Joffe, 22314 James Alan Cir., Chatsworth, CA (US) 91311

( * ) Notice: Subject to any disclaimer, the term of this patent is extended or adjusted under 35 U.S.C. 154(b) by 1,415 days.

(21) Appl. No.: 08/485,492

(22) Filed: Jun. 7, 1995

Related U.S. Application Data

(63) Continuation of application No. 08/279,551, filed on Jul. 25, 1994, now Pat. No. 5,524,499, which is a continuation of application No. 07/952,471, filed on Sep. 28, 1992, now Pat. No. 5,331,861, and a continuation of application No. 07/532,743, filed on Jun. 4, 1990, now abandoned.

(51) Int. Cl.⁷ ............................................... F16C 31/04
(52) U.S. Cl. .......................................... 384/8; 384/446
(58) Field of Search ........................... 384/8, 446, 448, 384/43, 45

(56) References Cited

U.S. PATENT DOCUMENTS

| 3,720,849 A | 3/1973 | Bardocz ........................ 310/8 |
| 4,898,480 A | * 2/1990 | Raj et al. .................... 384/446 |
| 5,001,351 A | 3/1991 | Boksem ................... 250/442.1 |
| 5,237,238 A | 8/1993 | Berghaus et al. ........... 310/328 |
| 5,380,095 A | 1/1995 | Pryor ............................. 384/8 |
| 5,407,519 A | 4/1995 | Joffe et al. .................. 156/358 |

OTHER PUBLICATIONS

Unidentified authorship, "The Various Guiding Principles 1. The Magnetic–Kinematic Principlep", unidentified scientific journal or textbook (circa 1987), p. 33.

* cited by examiner

Primary Examiner—Lenard A. Footland
(74) Attorney, Agent, or Firm—Peter I. Lippman

(57) ABSTRACT

A precision moving table system for transverse translation and comprising:

first and second relatively movable table members, the first member supporting the second member at respective opposing surfaces of the members, at least one of said members comprising a magnet; and a first set of rolling elements held firmly, by magnetic force developed by the magnet, between the opposing surfaces of the members for fully rolling motion along both members to support the second member in transverse translation;

wherein at least some of the rolling elements roll along the magnet.

30 Claims, 31 Drawing Sheets

MAGNETICALLY STABILIZED PRECISION TABLE AND LOAD-CARRYING BEARINGS

RELATED APPLICATIONS

This is a continuation-in-part of copending application Ser. No. 08/279,551, filed as a continuation application on Jul. 25, 1994, and copending herewith, and now issued as U.S. Pat. No. 5,524,499; and of its parent application Ser. No. 07/952,471, filed as a file-wrapper-continuing application on Sep. 28, 1992, and issued Jul. 26, 1994, as U.S. Pat. No. 5,331,861; a continuation of the grandparent application Ser. No. 07/532,743, filed Jun. 4, 1990, and now abandoned.

The copending application in its entirety is hereby incorporated by reference into this document.

Other related applications filed substantially concurrently with the present application and copending herewith include Ser. No. 08/480,561, now issued as U.S. Pat. No. 6,176,616; Ser. No. 08/487,067, now issued as U.S. Pat. No. 6,093,989; and Ser. No. 08/485,473, now issued as U.S. Pat. No. 5,986,372.

BACKGROUND

1. Field of the Invention

The invention relates generally to precision moving tables, and load-supporting precision bearings; and more specifically to such devices that are stabilized magnetically.

2. Related Art

Both of my earlier patent documents identified above teach use, in mechanical drives, of couplings or bearings that typically transmit linear motion along a drive direction. These couplings may be said to "carry" a load in the sense of load transmission, but not generally in the sense of support.

These couplings absorb lateral motions through rolling action of balls between coupling or bearing elements. At least one of these elements is a magnet that retains the balls between the elements—and in some configurations helps keep the elements in line. The magnet also creates compressive constraint along the drive direction; this constraint prevents backlash.

The first of my two earlier patent documents identified above relates particularly to drives in which linear motion along the drive direction is derived from rotary motion about an axis parallel to that same drive direction. The second document relates to specific coupling configurations that typically transmit torque as well as longitudinal linear motion.

The present document is not directed either to the context of rotary drives or to the transmission of drive force or torque. It does, however, employ some devices that are related to wobble-absorbing bearings and couplings disclosed in those earlier patent documents.

For brevity and simplicity in this document some terminology is used in a manner that may be partially specialized:

In accordance with standard practice in discussing practical systems, the terms "cylindrical", "cylinder", "spherical" and "sphere"—except where context otherwise indicates—refer to surfaces and articles that either are formed as portions of cylinders and spheres, not necessarily entire cylinders and spheres, or that relate to cylinders and spheres.

Thus for instance a "cylindrical axis" is the axis of a cylinder or part of a cylinder, a "spherical center" is the center of a sphere or part of a sphere, etc.

To a certain extent the terms "tables" and "load-supporting bearings" are interchangeable. A small table may be semantically and functionally indistinguishable from a large bearing.

Generally the invention taught in this document deals with load-supporting bearings, as distinguished from other sorts—such as drive bearings, rotary-motion axle supporting bearings, etc. Therefore, except where context suggests otherwise, references to "bearings" of this invention, in the text and appended claims of this document, encompass like structures used as tables; and conversely.

The word "bearings" encompasses laterally guiding devices that may sometimes operate entirely or partly in tension, as well as compressive-support bearings per se.

In this regard a support that takes the form of a suspension device may be traditionally regarded as a "bearing"; for present purposes such a suspension device may as well be a "table"—even if articles positioned along the table are actually hanging from it.

The word "wobble" is used in an extremely general way, to encompass any spurious lateral motion—such as vibration, play, and jitter, that are lateral with respect to an intended direction of force transmission—as well as spurious motions that are generated incidentally to a desired rotation and therefore perhaps more classically identifiable as wobble.

Accordingly, the lateral-motion-absorbing devices of my earlier patent documents as well as this one may be conveniently called "wobble-absorbing magnetic bearings", or "WAM" bearings—or simply "WAMBs". In this document, reference to such WAM bearings encompasses the varieties disclosed in those earlier documents as well as those disclosed here.

My earlier patent documents discuss an invention of Norris, a rotary-motion bearing with ferromagnetic balls that are held in place without a bearing spacer or bearing retaining-ring holder by making one of the bearing surfaces magnetic. Norris does not teach a wobble-absorbing bearing, or a load-carrying (in the sense of load-supporting) bearing or table.

In addition to the art cited in, and in connection with prosecution of, my above-identified earlier patent documents, I have noted the following materials which may be of interest:

U.S. Pat. No. 3,720,849 Bardocz
U.S. Pat. No. 5,407,519 Joffe et al.
U.S. Pat. No. 5,380,095 Pryor
U.S. Pat. No. 5,237,238 Berghaus
U.S. Pat. No. 5,001,351 Boksem.

Bardocz deals with improving the positioning precision of a ball-mounted moving table through magnetic constraints. He mentions that backlash along a drive direction too can be removed through magnetic constraint.

Bardocz is not at all specific about the manner in which his tables are magnetically constrained; thus his teachings in some regards are rather incomplete. There is some evidence that Bardocz's teachings may have been elaborated and refined commercially, as shown by FIG. 49, which is copied from a scientific-instrument journal (unidentified) circa 1987.

The drawing shows that balls roll along hardened steel inserts in V-grooves, and in one position a flat groove, formed in opposing surfaces of a table "positioner" mechanism. Magnets are shown inserted laterally inboard of the grooves, in the lower surface, to attract ferromagnetic inserts in the upper surface.

An accompanying graph (not reproduced here) shows "Typical tracking precision" of the device—height variation along a 12 mm path. The graphed values range generally within very roughly ±0.2 micron.

Accompanying text explains that "the whole positioner is held together by magnetic forces", and describes the function of the magnetic inserts:

"These pieces, separated by only a few tenths of a millimeter, pull strongly toward each other. As the magnetic forces do not change much for small variations of distance, the force pressing the positioner together remains constant even considering the . . . disadvantages of rolling elements. A symmetrical movement is guaranteed as the strain on the whole positioning range remains constant . . . ."

Study of the drawing makes plain that the strongest magnetic forces, being aligned with the magnets, are offset inboard from the load-bearing balls.

The opposing horizontal surfaces, however, are not directly supported (i.e., held apart) in the region between the balls. As a result the magnetic attraction tends to deform the illustrated structure, bowing the opposing horizontal surfaces together in the unsupported region.

Such distortions can create significant variations in elevation (and to a lesser extent angle) along the upper surface of the table. If apparatus is mounted over a significant span of that upper surface, the table distortions can mechanically induce corresponding distortions and stresses in that apparatus—potentially leading to spurious responses, not readily recognized or traced, of the apparatus.

Also, this article excerpt contains no suggestion that the technology might be pertinent to nonplanar surfaces. At this writing I have been able to learn no more about commercialization of the Bardocz invention; to the best of my knowledge no such effort has incorporated the claimed invention of the present document.

The Pryor patent may be truly termed the Pryor art, but by virtue of the earlier filing date of my '743 application the Pryor art is not prior art with respect to that part of the subject matter herein which is disclosed in my U.S. Pat. No. 5,331,861. Pryor too relates to magnetic constraint of moving tables, and analogous modules such as drawer slides; as he says at the outset, however, he is not concerned with extremely high precision.

Pryor uses individual balls that either slip in setscrew ball nests and roll on opposing surfaces, or bind in the nests and slip on the opposing surfaces, or slip both on the nests and on the opposing surfaces. None of Pryor's ball elements is fully rolling—i.e., able to roll at both sides of its interface.

Wobble (as above defined) between two interfacing elements (e.g., stages) of tables and bearings can have both translational and rotational components. It is a problem in many types of mechanisms because it causes small but significant errors in the work process being performed.

A table element (stage) or like object can be moved into a stationary position on a nominally planar guide surface, suspended on rollable balls kinematically as Bardocz teaches and the above-discussed diagram shows (or by setscrew-positioned sliding balls as Pryor teaches). In this case the object or stage may be subject to rather excessively high loading of each ball.

If instead multiple supports are provided, each extending over a wide range of positions, inevitably mismatches occur between nominal and actual shapes and orientations of the surfaces of the several supports—and of the nominally flat guide surface too. Such mismatches introduce positioning error or uncertainty and in some cases even ambiguity, i.e. multivalued positioning functions, hysteresis etc.

All such disturbances are collectively termed "wobble" for present purposes. As suggested above they typically include spurious small rotational inconsistencies in orientations, as well as inconsistencies in average elevations, of arbitrarily selected support sites.

Like sources of error are often present in undersurfaces of (or within mechanisms associated with) the driven table or object. Therefore, in particular, rotary mismatches between support sites on the guide surface and sites under or in the driven object may be compound—i.e., characterized by rotations about more than one center.

All these limitations are exacerbated where tables are not only positioned on but moving over the guide surface. All such drawbacks represent a problem in the art of precision tables and bearings.

SUMMARY OF THE INVENTION

My invention solves this problem easily, simply and inexpensively. In most instances it does so with only a minor increase in complexity of the apparatus.

According to the invention, no effort is made to remove either wobble effects or irregularities that are present in a guide surface or the undersurface of a mating driven object. Nevertheless adverse effects upon the workpiece or other movable object, and upon other elements of the system, are substantially eliminated.

Some of these benefits are obtained through certain details in the application of magnetic force to stabilize a table or bearing. Other benefits rely on use of one or more WAM bearings as supports—either static or dynamic.

A great many variations and refinements enhance both the precision and the practicality of these systems. The character and advantages of the present invention will be more fully understood from the following detailed description, with reference to the accompanying drawings of which:

DETAILED DESCRIPTION OF PREFERRED EMBODIMENTS

Figure 1:
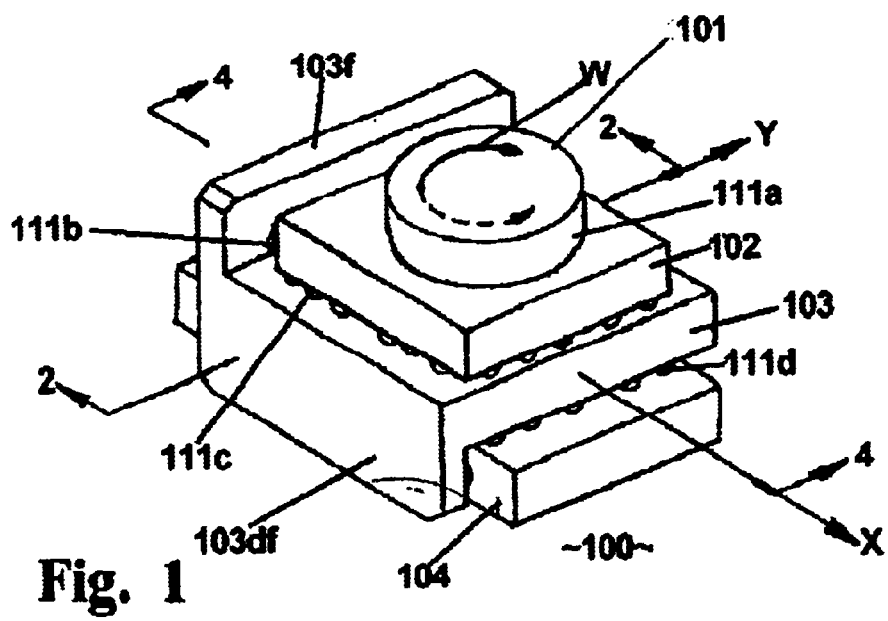
FIG. 1 is a perspective view of a representative xyθ table according to preferred embodiments of my invention and particularly incorporating balls or other rolling elements that operate directly on a magnet surface.

The accompanying illustrations, particularly considering the foregoing orientation paragraphs, will be largely self explanatory to people skilled in the field of this invention. Therefore I will refrain from dwelling greatly on mechanical features and functions that are apparent or inherent in the drawings, and will instead focus upon principles of my invention that are important to optimizing its benefits.

1. ELEMENTS FULLY ROLLING ON MAGNET SURFACES

In some forms of my invention, rollers or balls 11 are fully rolling along the surface or surfaces of one or more magnets 17, 117. This feature appears in the system of FIGS. 1 through 4.

By "fully rolling" I mean that each ball rolls along both of the opposing surfaces between which it is captured. As will be seen, I do not mean to imply that the balls necessarily roll on magnetic material directly.

Here a support (often familiarly referred to as "the world") 100 carries a series of mutually movable precision table stages 101–104. The topmost stage 101 is for supporting and precisely positioning some workpiece such as an optical element and is disposed for fully rolling rotation ω, about a central vertical axis, relative to the lower stages 102–104. This top stage is supported by a first set of load-bearing balls 111a. As shown, these balls are preferably constrained by an opposed pair of circular V-grooves (FIGS. 2 through 4A) formed respectively in the underside of the top stage 101 and in the upper surface or wall of the next stage 102 down.

Formed at the center of the underside of the upper stage 101 is a central armature or downward step 101'. As shown, this central substructure is penetrated by magnetic flux 18 from an annular magnet, or magnetized magnetic material, 117 that is embedded in a horizontal main section of the third stage 103.

This flux penetration results in magnetic force that firmly holds down (adding to the gravitational force), and if one or both V-grooves were omitted would also tend to center, the upper stage 101 relative to the second stage 102. These and other magnetic forces due to the permanent or temporary magnet 117 hold the entire mechanism firmly together against play or backlash in all directions.

As those skilled in the art will appreciate from the illustrations, the balls 111a are fully rolling against the walls of the grooves if present. The skilled artisan will further appreciate from the drawings that if either or both of the V-grooves were omitted, the balls 111a would be fully rolling against the flat surface or surfaces of the stage or stages from which the groove is omitted.

Figure 1A:
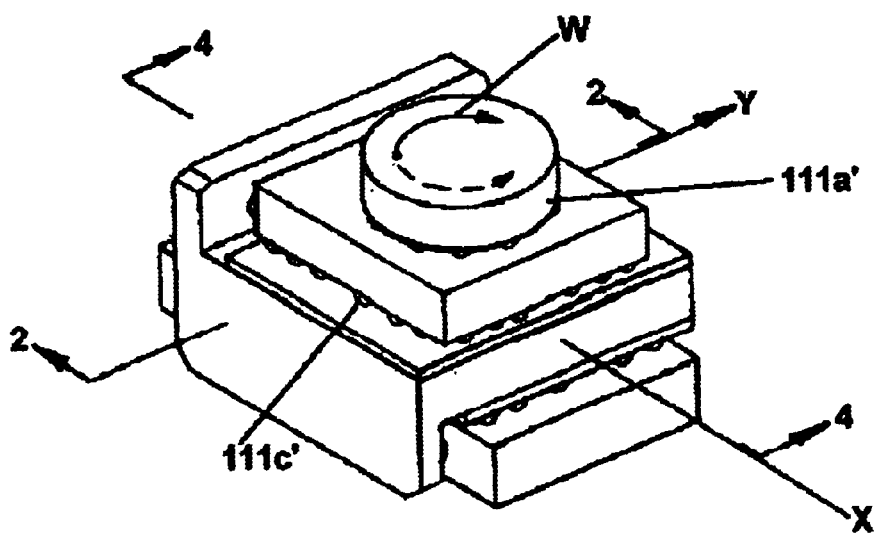
FIG. 1A is a like view of a variant of the FIG. 1 table, having in certain locations more-closely spaced balls as described in subsections 1 and 4 herebelow, and analogous to those also appearing in FIGS. 10 through 15, 24 through 30, and 44 through 48.
Figures 2, 2A:
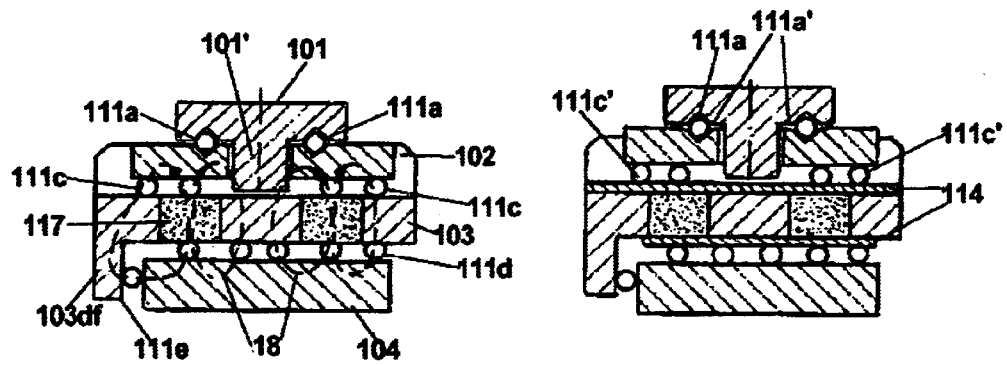
FIG. 2 is a side elevation, in cross-section, of the FIG. 1 table.
FIG. 2A is a like view of a variant of the tables of FIGS. 1, 1A and 2, having more-closely spaced balls as just mentioned for FIG. 1A, and also having facing plates as discussed in subsection 2 herebelow, and analogous to those also appearing in FIGS. 5 through 8, and FIG. 13.
Figure 3:
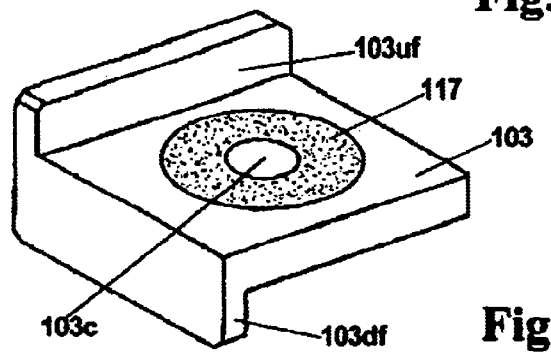
FIG. 3 is a perspective view showing the x stage of the FIGS. 1 and 2 table.
Figures 4, 4A:
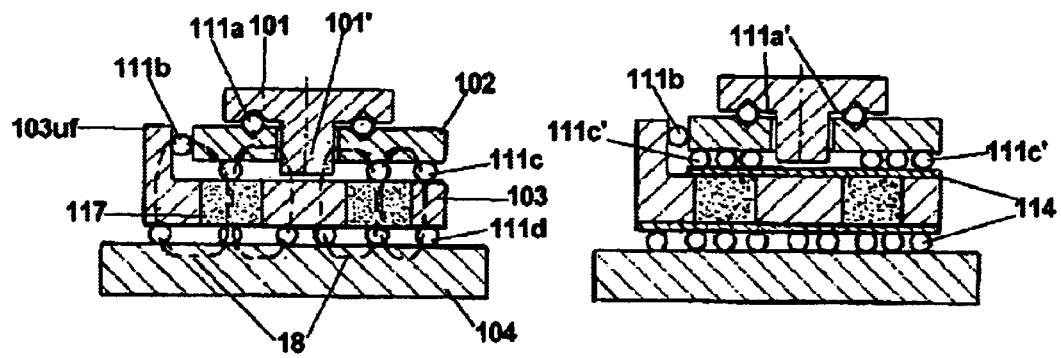
FIG. 4 is a front elevation of the same table.
FIG. 4A is a like view of the FIG. 2A variant.
Figure 5:
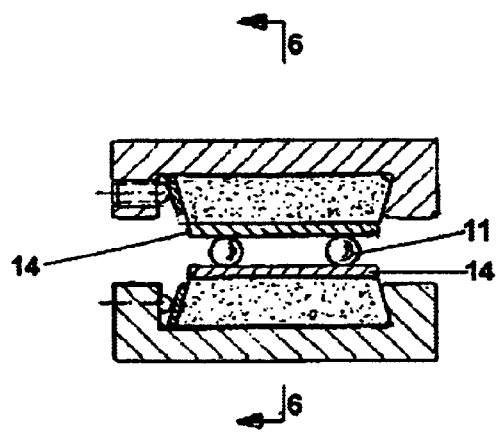
FIG. 5 is an elevation, in cross-section, showing preferred ball-to-magnet engagement arrangements according to some preferred embodiments of my invention and particularly incorporating a facing to protect the magnets.
Figure 6:
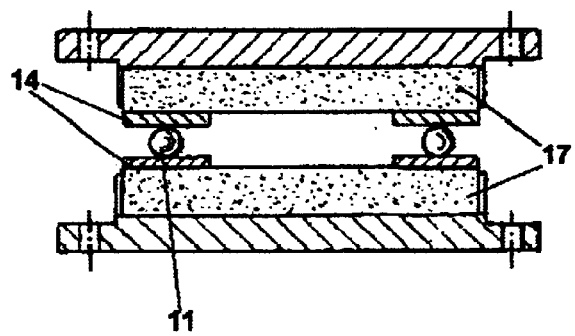
FIG. 6 is a like view taken at right angles to FIG. 5, along the line 6—6 in FIG. 5.

Spacing of the balls apart from one another may be relatively wide as shown for e.g. the balls 111a, 111c in FIGS. 1, 2 and 4; but for certain purposes and reasons elaborated in section 4 hereunder may be preferably instead much narrower as shown for e.g. the balls 111a', 111c' in FIGS. 1A and 2A. Those skilled in the art, guided by all of the disclosures hereunder, will appreciate that the circular symmetry of the upper-stages movement will more particularly benefit from such narrow spacing if magnetic-flux lines 18 extend further or more strongly into and through the upper, flat portion of the top stage 101; however, with respect to balls 111a' the general principle is adequately illustrated in FIGS. 2A and 4A.

Analogously the second stage 102 is disposed for fully rolling horizontal displacement y relative to the lower stages 103, 104. The second stage is constrained against any other horizontal movement by an upward-extending flange 103uf, formed in the next stage 103 down and acting laterally through an additional set of balls 111b.

As shown in FIGS. 4 and 4A, the magnetic flux 18 due to the annular magnet or magnetized magnetic material 117 extends through these side-acting balls 111b and the upward flange 103uf, as well as through the other elements of the multistage table. These side-acting balls 111b, too, are fully rolling laterally against the vertical surfaces of both the flange 103uf and the side surface of the second stage 102. As noted above, all the resulting magnetic forces draw the mechanism firmly together, substantially eliminating backlash in all directions.

The second stage 102 is supported by a second set of load-bearing balls 111c, which is actually two subsets that are opposed (i.e. below opposite edges of the second stage), plus a third subset in a centered circular pattern between the first two, and which all fully roll against the flat surfaces at the underside of the second stage 102 and top of the third stage 103. Included among the latter surfaces is the upper flat surface of the annular magnet or magnetic material 117, so that in particular some (the inner, circular array) of the balls 111c fully roll against the magnetic-material surface; however, as explained at length herebelow the magnetic-material surface may be protected, by for example an interposed upper facing 114, against cracking or other damage from the concentrated force of weight loading at the ball contact points.

As mentioned earlier, each of the two opposed ball sets 111c (each being relatively widely spaced internal to itself) may be replaced by a more-narrowly or -closely spaced set 111c'. Those skilled in the art, guided by all of the disclosures hereunder, will appreciate that the linear symmetry of these two ball sets would more particularly benefit from such narrow spacing if the structure of magnetic-flux lines 18 were linearly rather than circularly symmetrical; however, with respect to balls 111a' the general principle is adequately illustrated in FIGS. 1A and 4A.

Further analogously the third stage 103 is disposed for fully rolling horizontal displacement x relative to the remaining bottom stage or base 104, being supported by a third set of load-bearing balls 111d. This third stage 103 is also constrained against any other horizontal movement by its downward-extending flange 103df, which bears laterally against a side wall of the base 104, once again through another set of side-acting balls 111e that are penetrated by magnetic-flux lines 18.

Here too the balls 111d are fully rolling against the flat surfaces at the underside of the third stage 103 and top of the fourth stage 104. Included among the latter surfaces is the lower flat surface of the annular magnet or magnetic material 117, so that in particular some (another inner, circular array) of the balls 111d fully roll against the magnetic-material undersurface; however, as explained at length herebelow the magnetic-material surface may be protected, by for example an interposed lower facing 114, against cracking or other damage from the concentrated force of weight loading at the ball contact points. Furthermore the associated second side-acting ball set is fully rolling against both engaged vertical surfaces, namely those of the downward flange 103df and the side wall of the bottom stage or base 104.

As will be plainly understood from the drawings, the third stage 103 with its upward flange 103uf is seen to define a pair of "interfaces" between members of the multistage table system, one interface above the flat, horizontally extended main part of the third stage and one interface laterally adjacent to the upward flange 103uf. Each of these interfaces is shaped and oriented for constraining relative movement between the members of the system with respect to at least one direction of motion, namely vertical motion in regard to the main, horizontally extended part of the third stage 103 and lateral horizontal motion in regard to the upward flange 103uf.

The second stage 102 is shaped and disposed to fit at both these interfaces. The rolling elements 111b, 111c (or 111c') are held firmly, by magnetic forces developed by the annular magnetic material 117, between the members at both interfaces respectively, for fully rolling motion along both members at both interfaces. As shown, both interfaces are preferably planar.

Further the third stage 103 with its downward flange 103df is seen to define another pair of interfaces between members of the multistage table system, one interface below the flat, horizontally extended main part of the third stage and another interface laterally adjacent to the downward flange 103df. Each of these interfaces, too, is shaped and oriented for constraining relative movement between the members of the system with respect to at least one direction of motion, namely vertical motion in regard to the main, horizontally extended part of the third stage 103 and lateral horizontal motion in regard to the downward flange 103df.

The fourth stage or base 104 is shaped and disposed to fit at both the interfaces in this lower pair. The rolling elements 111d, 111e are held firmly, by magnetic forces developed by the annular magnetic material 117, between the members at both interfaces respectively of the lower pair, for fully rolling motion along both members at both interfaces. As shown, both interfaces in this pair too are preferably planar.

Notwithstanding the V-grooves formed in the upper surface of the second stage 102, it may also be noted that that stage too defines upper and lower interfaces: its upper interface is with the first stage 101, and its lower interface is with the third stage 103. The upper interface is shaped and oriented, by virtue of the V-grooves, for constraining relative movement between the top two stages 101, 102; and the lower interface is shaped and oriented, by virtue of the upward-extending flange 103uf and side wall of the second stage 102, as mentioned earlier, for constraining relative movement between the second and third stages 102, 103.

As illustrated the magnetic flux in fact penetrates all the ball sets 111a–e directly, thereby strengthening and stabilizing the magnetically produced coherence of the entire mechanism and thus further minimizing backlash and play omnidirectionally, although those skilled in the art will appreciate that penetration of the topmost ball set 111a may be relatively weak by virtue of the geometry. This penetration may be enhanced, however, as will now be evident to the skilled artisan, by enlarging the radial clearance between the previously mentioned central step or armature 101' and the second stage 102, or by any of various other straightforward geometrical changes.

Figure 49:
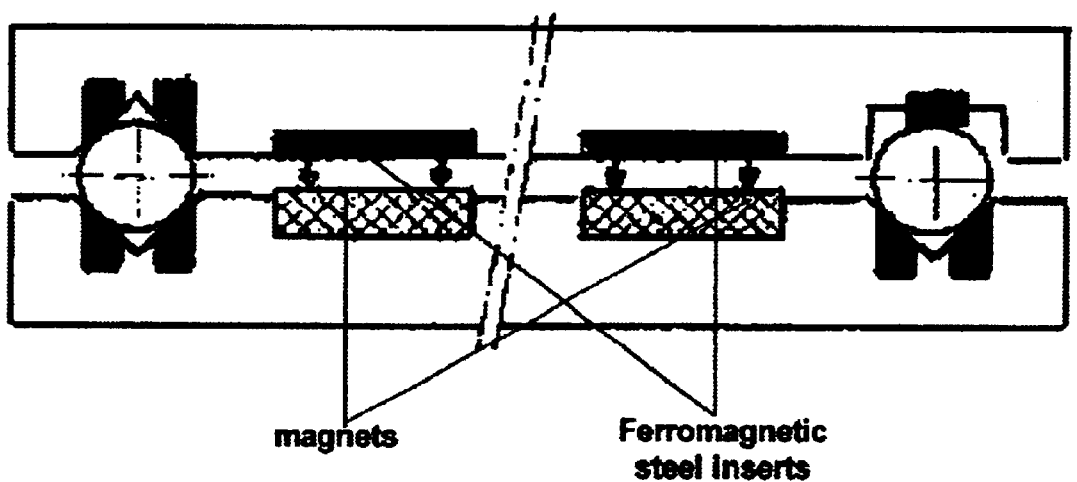
FIG. 49 is a cross-sectional elevation of prior-art apparatus discussed earlier in this document.

My invention is the first known table or bearing that uses rolling elements which fully roll along magnet surfaces. The primary point of this arrangement is that it avoids the prior-art limitations illustrated in FIG. 49 and discussed earlier: magnetically applied force here is aligned with mechanical support, instead of being cantilevered out over a distortion-inviting span.

Figure 7:
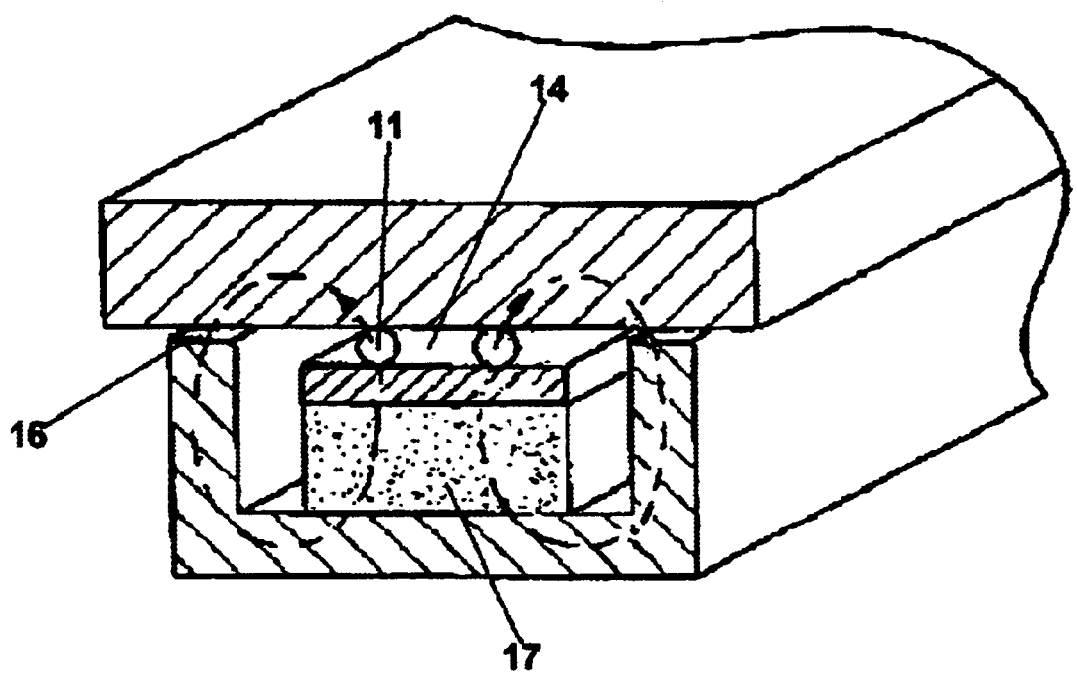
FIG. 7 is a somewhat schematic cross-sectional elevation showing operation of a long translational stage and particularly incorporating a fine airgap in other regions between the moving element of the table and the base.
Figure 8:
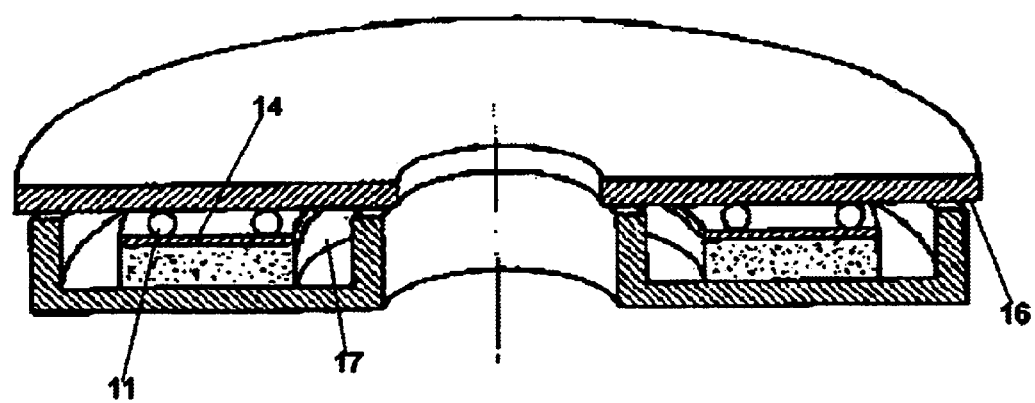
FIG. 8 is a like view of a rotary table.
Figure 9:
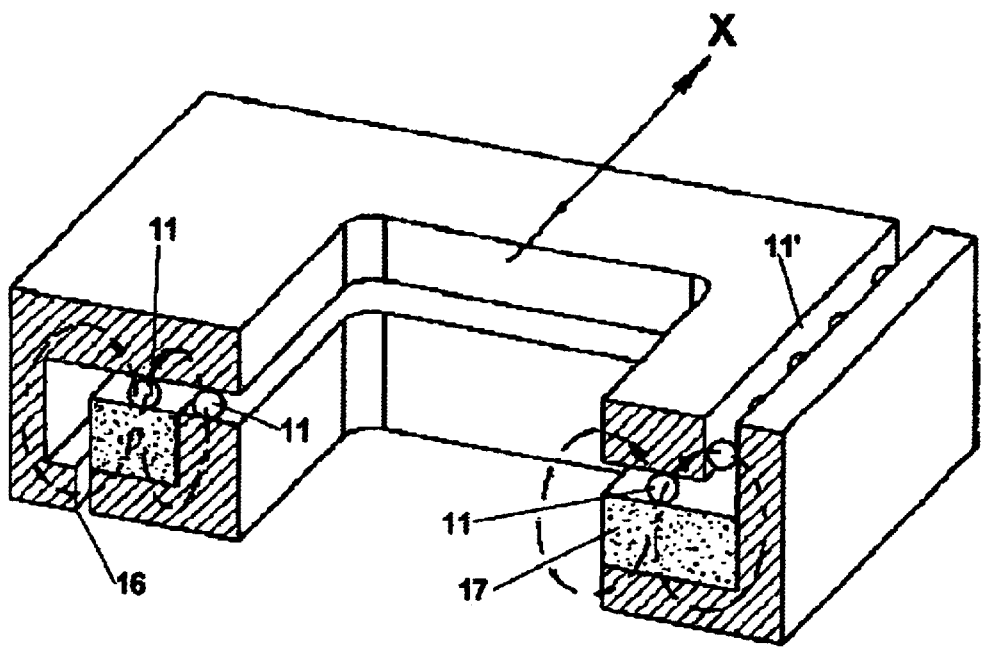
FIG. 9 is a perspective view of another translational stage according to preferred embodiments of my invention and particularly illustrating careful control of magnetic flux paths for best performance.

A secondary advantage of this arrangement is that magnetic flux is concentrated through the balls, thereby making the magnetic force stronger for any given quantity (and bulkiness, weight, and cost) of magnetic material. Still another benefit is that the flux loops tends to be well confined, often being completable through additional balls (as shown for the lateral guide-surface balls 11', e.g. in FIG. 9) or through fine air gaps 16 (e.g. FIGS. 7 and 9).

2. PROTECTIVE FACINGS AND PROCEDURES

FIGS. 5 through 12 illustrate that when balls 11 roll on the surfaces of some magnets 17 the magnet surfaces are advantageously protected by facing plates or sheeting 14. I have discovered that this is preferable particularly for magnets of ceramic materials, because they are relatively brittle and subject to cracking if dynamically loaded. Modern-day magnets of the highest strengths are made of such materials. The protective facing 14 may be preferably ferromagnetic material, such as hardened steel, that is very hard but not too brittle.

In addition I have found that it is very important to avoid shipping such assemblies under load. (Even assemblies in which rolling elements do not roll on magnet surfaces, though they are less likely to crack, are still best shipped unloaded—but for conventionally known reasons, e.g. to avoid distortion of the rolling elements or bearing surfaces.)

(d) Midlayer magnets in fully-rolling configuration—for a given amount of magnetic material, table size is reduced and magnetic strength further enhanced (and therefore overall system performance improved) by using a permanent magnet as a middle or intermediate layer in a multistage magnetic table.

A middle-layer magnet is particularly advantageous in the fully-rolling configurations introduced above. This feature appears in FIGS. 1 through 4 in a generalized form, and FIGS. 10 to 12 in a small round table that has V-groove guides cut into planar surfaces at both sides of the midlayer element.

Figure 11:
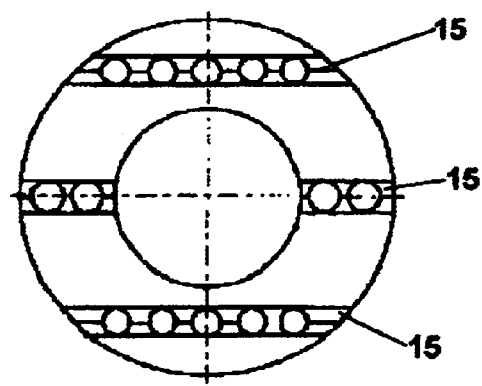
FIG. 11 is a bottom plan of the upper element of the same table, taken along the line 11—11 in FIG. 10.
Figure 10:
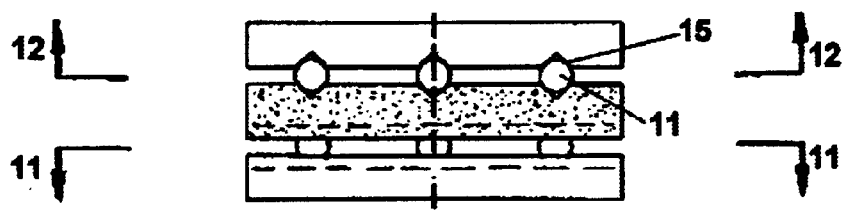
FIG. 10 is a side elevation of an xy table in accordance with further preferred embodiments of my invention and particularly incorporating guide grooves in opposing surfaces.
Figure 12:
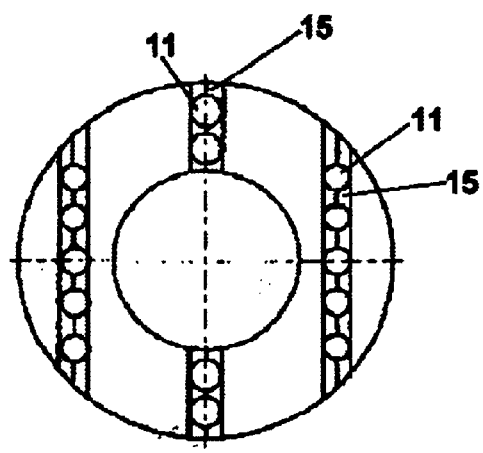
FIG. 12 is a top plan of the bottom element of the same table, taken along the line 12—12 in FIG. 10.
Figure 13:
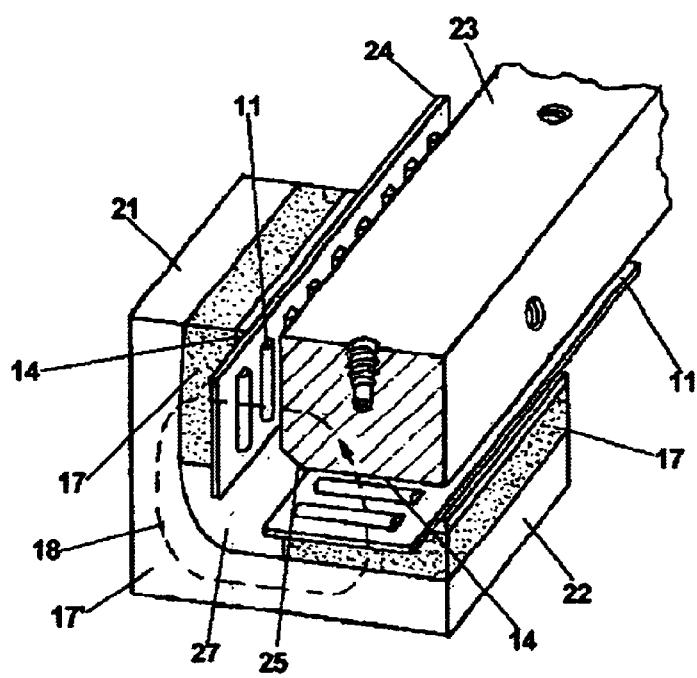
FIG. 13 is a perspective view of a long rectilinear bearing or table according to further preferred embodiments of my invention and particularly showing use of two rolling-element interfaces at an angle, to provide effective magnetic-flux loop closure intimately integrated with constraint with respect to multiple degrees of freedom.
Figure 14:
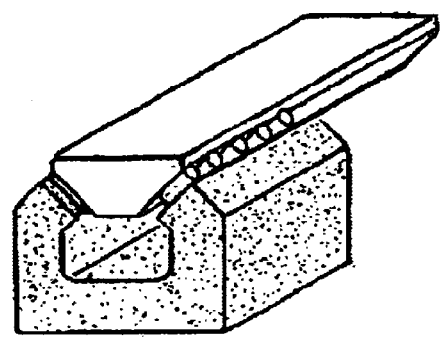
FIG. 14 is a like view of an analogous device that is somewhat differently configured and oriented.
Figure 15:
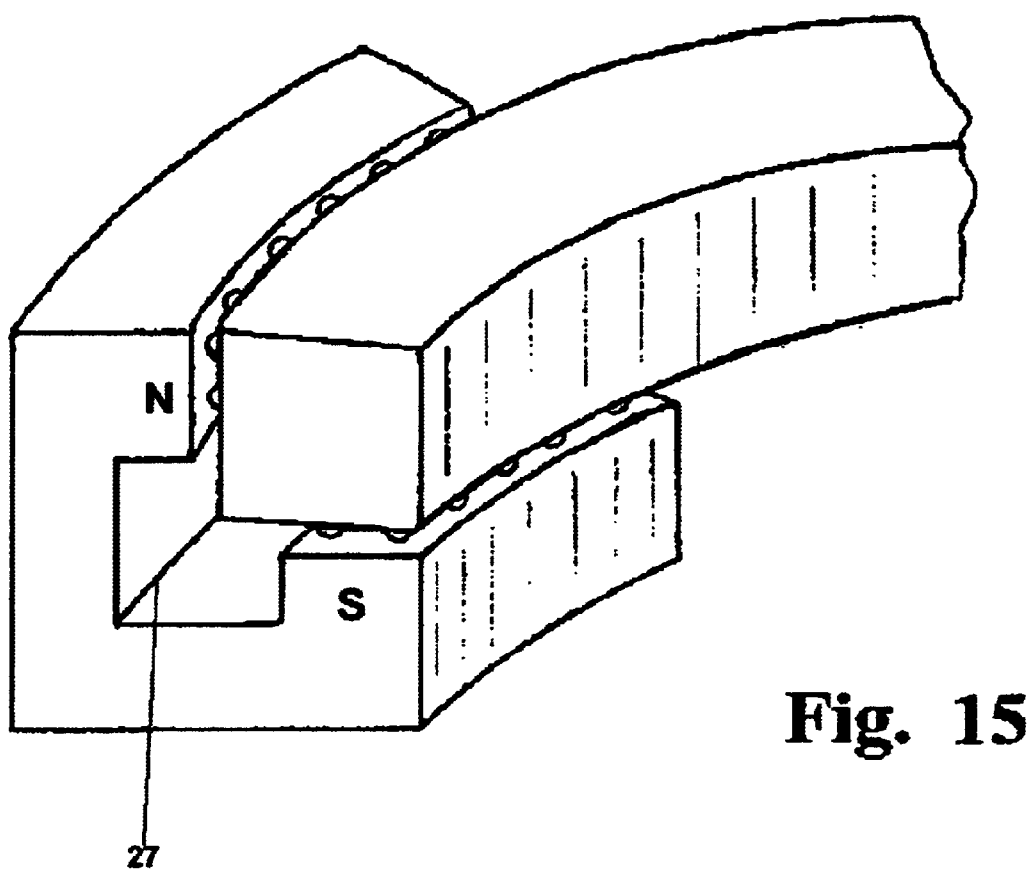
FIG. 15 is a like view of an analogous curvilinear device having one curved-surface and one planar interface.

The latter FIG. 10–12 system uses the planar-surface spacing as the air gap, and as in the more general case concentrates force and flux through the balls. If desired, guarding provisions can be added to reduce external flux leakage to nearby equipment.

3. DUAL-INTERFACE SUPPORT FOR OPTIMUM FLUX PERFORMANCE (a) Rectilinear- and hybrid rectilinear/curvilinear-interface traveling tables—All the configurations of FIGS. 13 through 27 can be operated inverted, or rolled over partway about certain selected axes. Furthermore in all these configurations either major element can be the "support" while the other is the "table".

If desired, all or part 17' of the major element that provides the two-rolling-interface yoke 27 can be magnetized to augment the magnets 17 on which the balls 11 roll. In any event a single magnetic flux loop 18 in common is advantageously closed in series through both interfaces.

Figure 16:
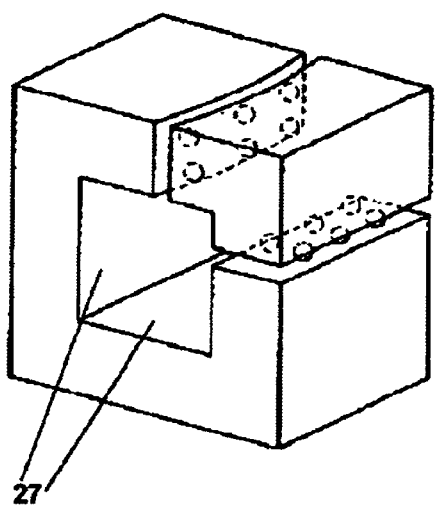
FIG. 16 is a like view of an analogous device made shorter and so perhaps more readily perceived as a bearing.
Figure 17:
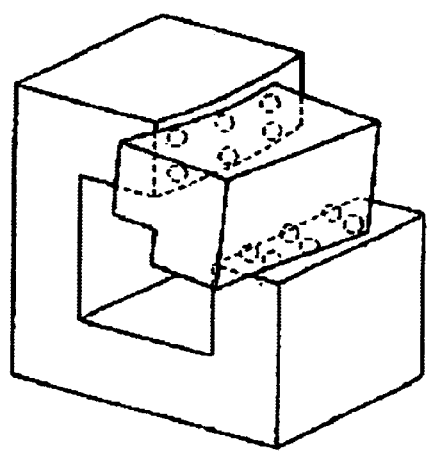
FIG. 17 is a like view of the FIG. 16 device but with rotational displacement between its major elements.
Figure 18:
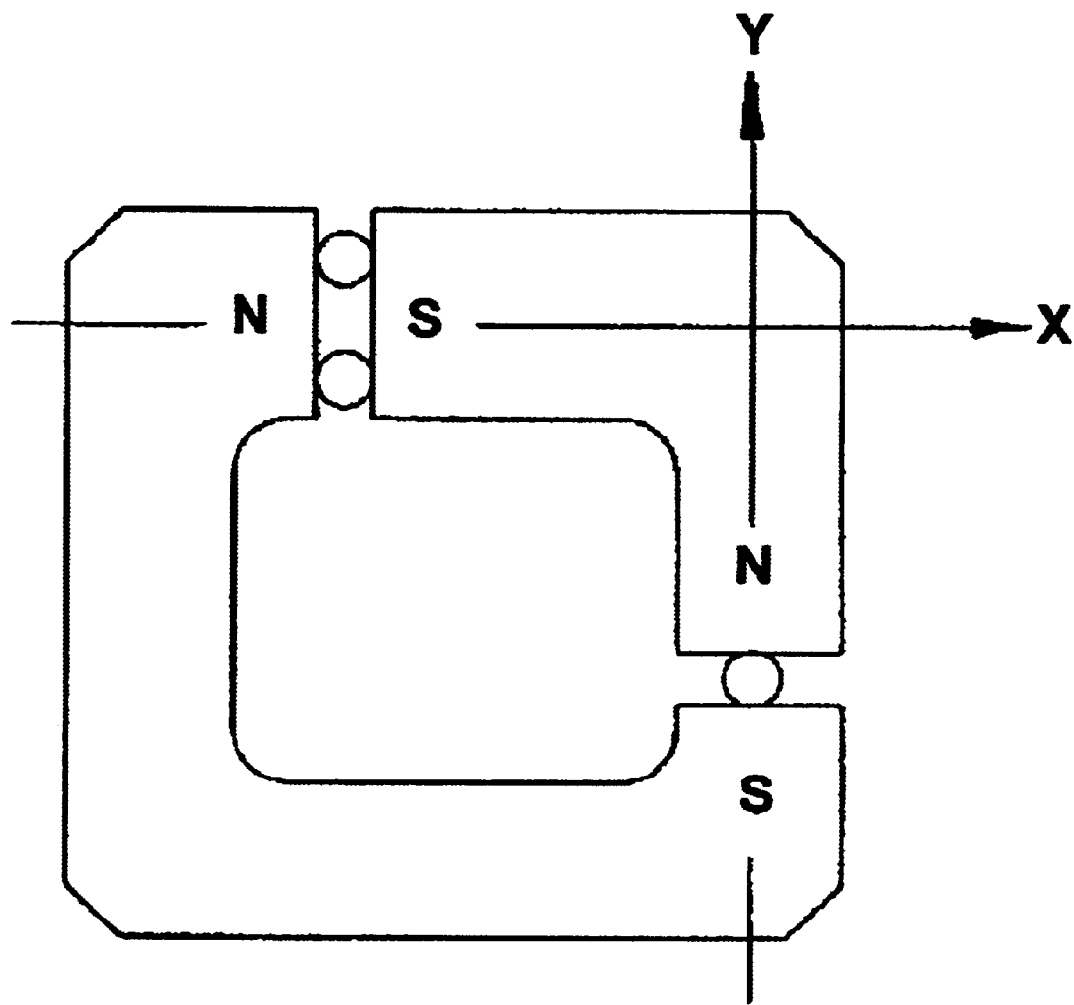
FIG. 18 is a somewhat schematic elevation of an analogous device having different load-transmitting or -carrying capabilities at its two interfaces respectively.
Figure 19:
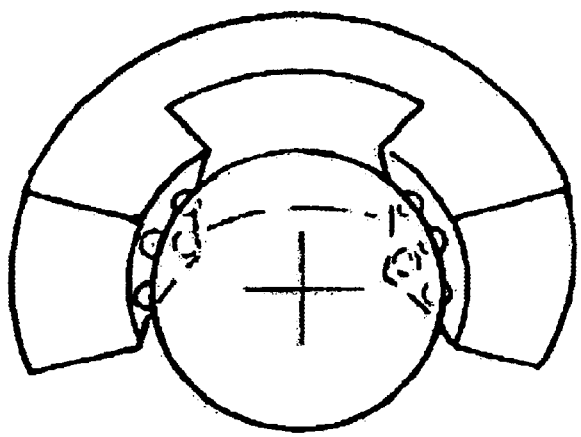
FIG. 19 is a perspective view of an analogous device having two interfaces that are spherical.
Figure 20:
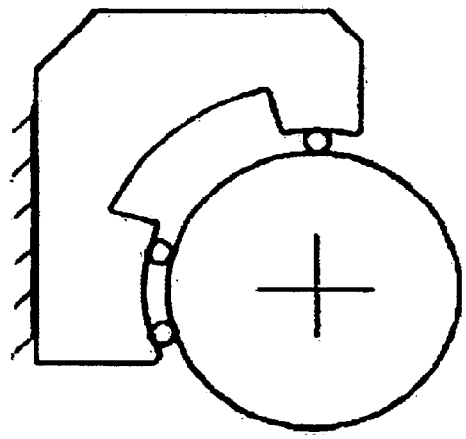
FIG. 20 is a plan of an analogous device having two interfaces that are cylindrical.
Figure 21:
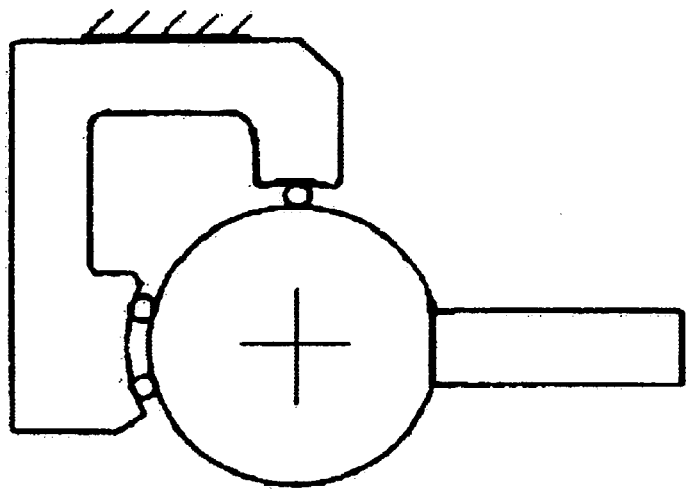
FIG. 21 is a schematic elevation of a like device used in a rotary-arm drive.
Figure 22:
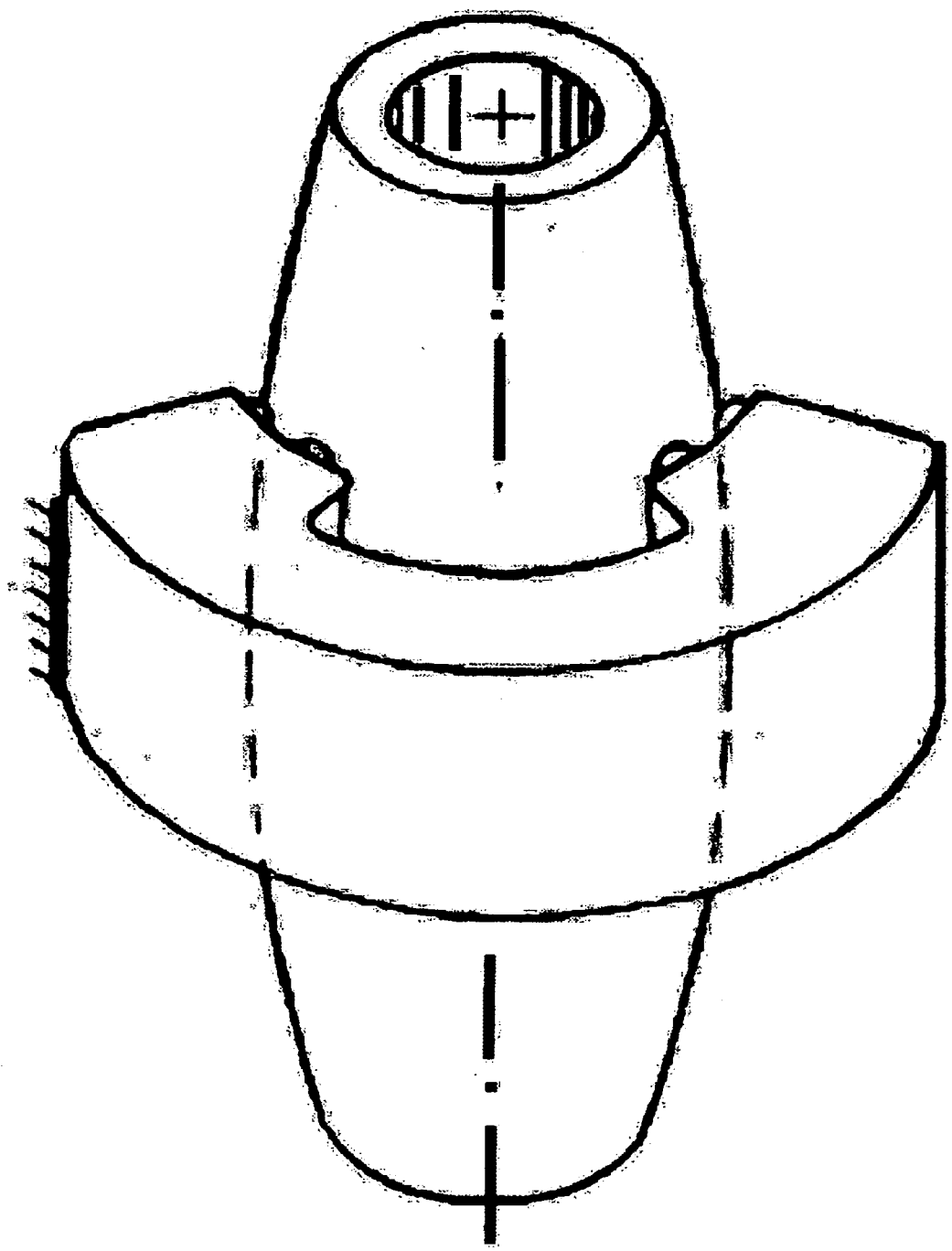
FIG. 22 is a perspective view of one element in still another analogous device in which the interfaces have two different cylindrical cross-sections in two orthogonal directions respectively.
Figure 23:
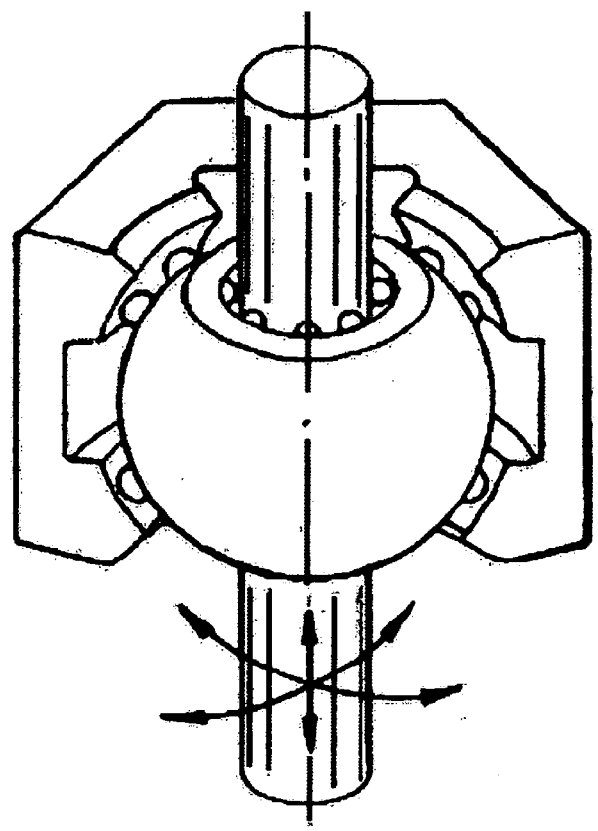
FIG. 23 is a perspective view of a device related to FIG. 19 or 22 and also having a vertical stage for axial translation.

(b) Hybrid-interface support bearings—Variants of the forms of FIGS. 16 and 17 can have curved-interface ball nests that are concave rather than convex. FIG. 18 illustrates, generally for all the dual-interface devices, that interface load-carrying characteristics need not be the same at the two interfaces.

Figure 24:
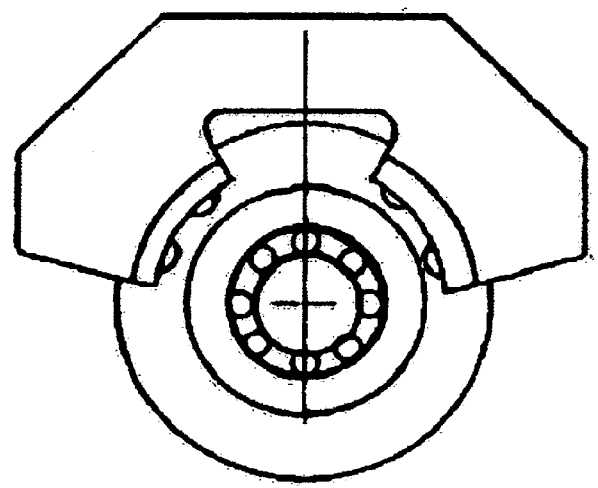
FIG. 24 is a plan of an analogous device related to that of FIGS. 20 and 21, but may also represent a cross-sectional plan of the device of FIG. 19, 22, or 23.
Figure 25:
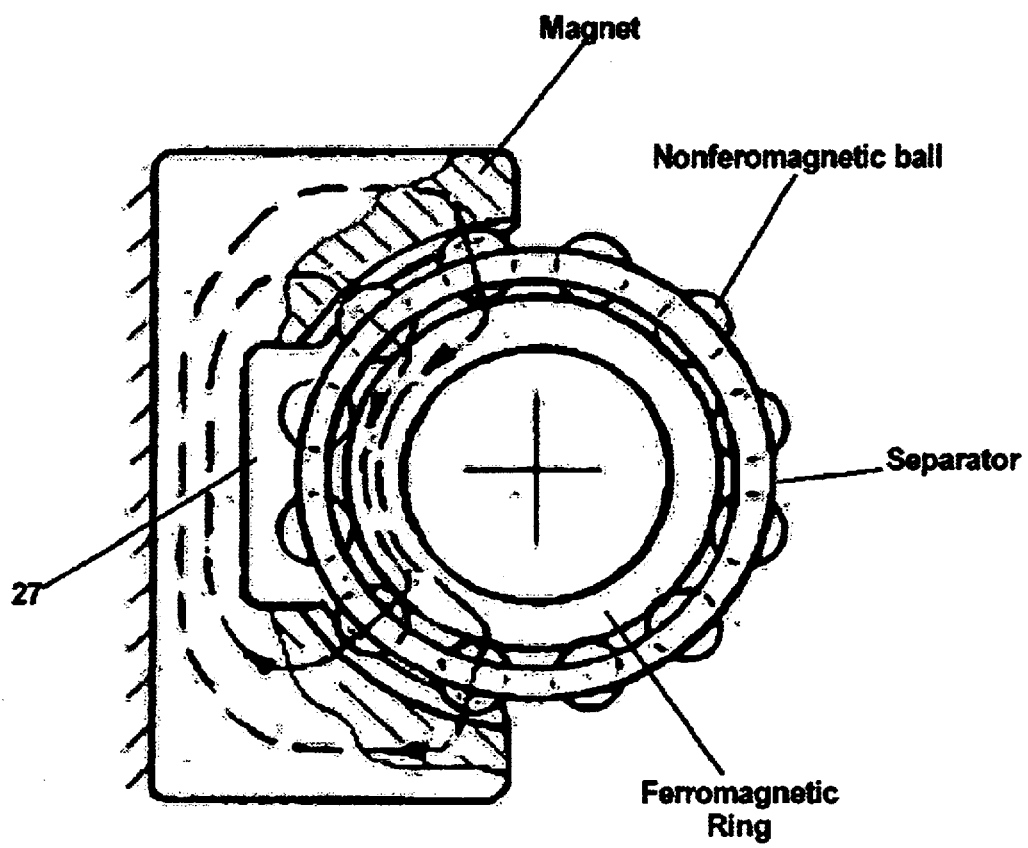
FIG. 25 is an analogous device having a roller bearing as one major element.
Figure 26:
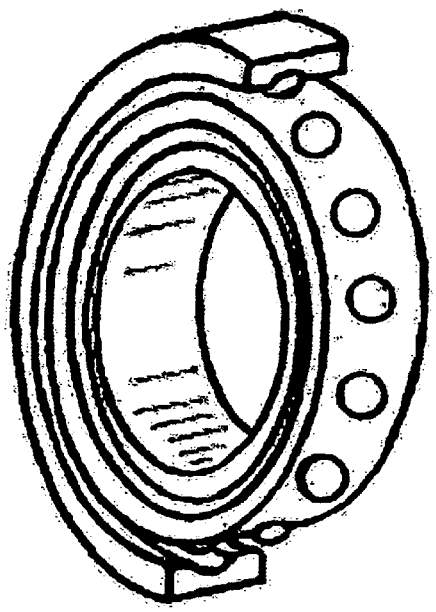
FIG. 26 is a variant of the FIG. 25 device.
Figure 27:
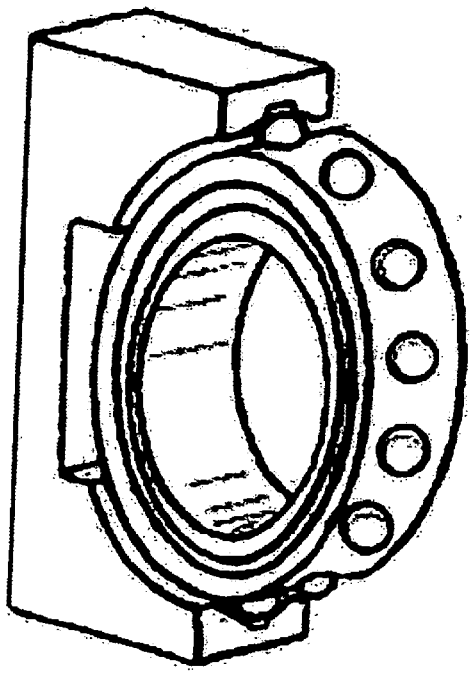
FIG. 27 is another variant of the FIG. 25 and 26 device.

(c) Two-curved-interface configurations—FIGS. 19 through 27 demonstrate that very freely operating and extremely precise U-joints, hinges, zθ joints (FIGS. 23 and 24) and many very highly specialized movements can be implemented through the dual-interface aspects of my invention. FIGS. 24 and 25 also show that a relatively shallow indentation 27 can serve as the dividing yoke segment that imparts the dual-interface character to a curved interface.

4. OUTBOARD-BALL CONFIGURATIONS FOR FLUX CONTROL

Figure 28:
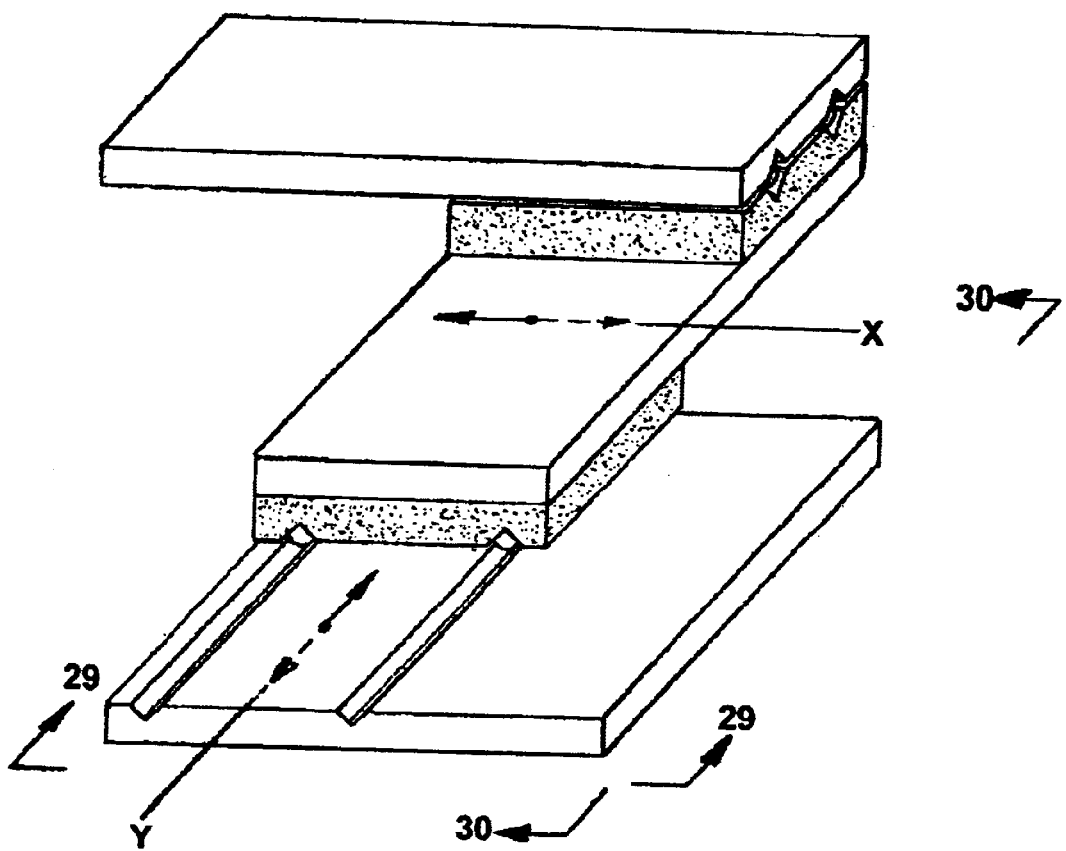
FIG. 28 is a perspective view of a device in accordance with yet other preferred embodiments of my invention and particularly incorporating the use of multiple closely-spaced balls or rollers to complete and confine the magnetic flux loop.
Figure 29:
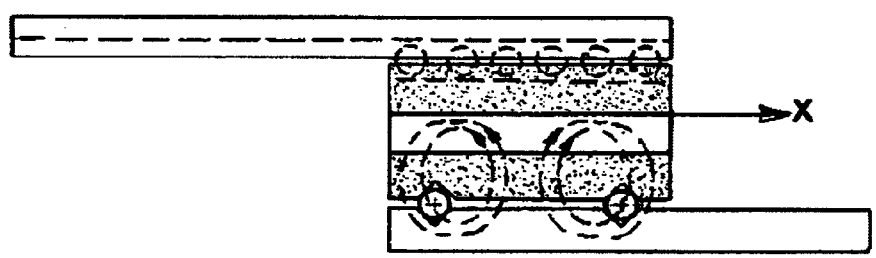
FIG. 29 is an elevation of the FIG. 28 device.
Figure 30:
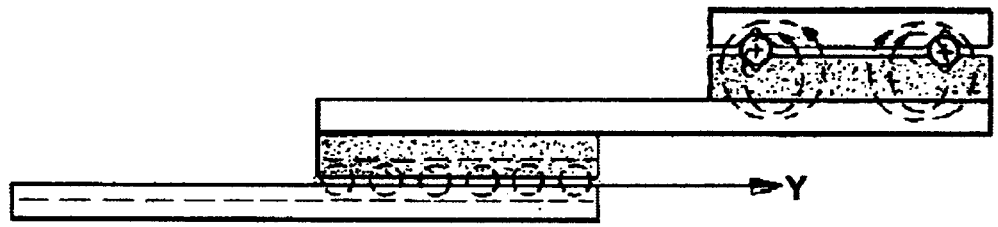
FIG. 30 is an elevation, taken at right angles to FIG. 29, of the same device.

It is not necessary that airgaps in my invention be near the periphery of a device. Instead a device according to certain aspects of my invention can and preferably does have a fine airgap near its center, and can close the magnetic loop through balls along the periphery (FIGS. 28 through 30).

Closing or closely confining the loop along the periphery—whether through the balls or in some other way—is usually desirable to maximize the magnetic force, for the amount and cost of magnetic material provided, and to minimize the leakage of magnetic flux toward sensitive equipment that may be nearby. Using the balls along the periphery to do this job can minimize the need for magnetic shielding.

For this purpose, particularly if flux splash is undesirable, it is best to use small balls (small spacing between the bottom rim and opposing plate) and to put in enough balls to fill at least 50% and preferably up to 95% of the peripheral distance. In other words, for this purpose the balls should be spaced apart by a distance between $\frac{1}{19}$ and 1 times their diameter.

To the extent that magnetic strength and flux splash are relatively less important and load-carrying strength is relatively more important, the balls can occupy preferably only 20% to 50% of the periphery.

5. HOLDING-FORCE AUGMENTATION, LONG DISPLACEMENTS, AND PLURAL TABLES ON A COMMON SUPPORT

Figure 31:
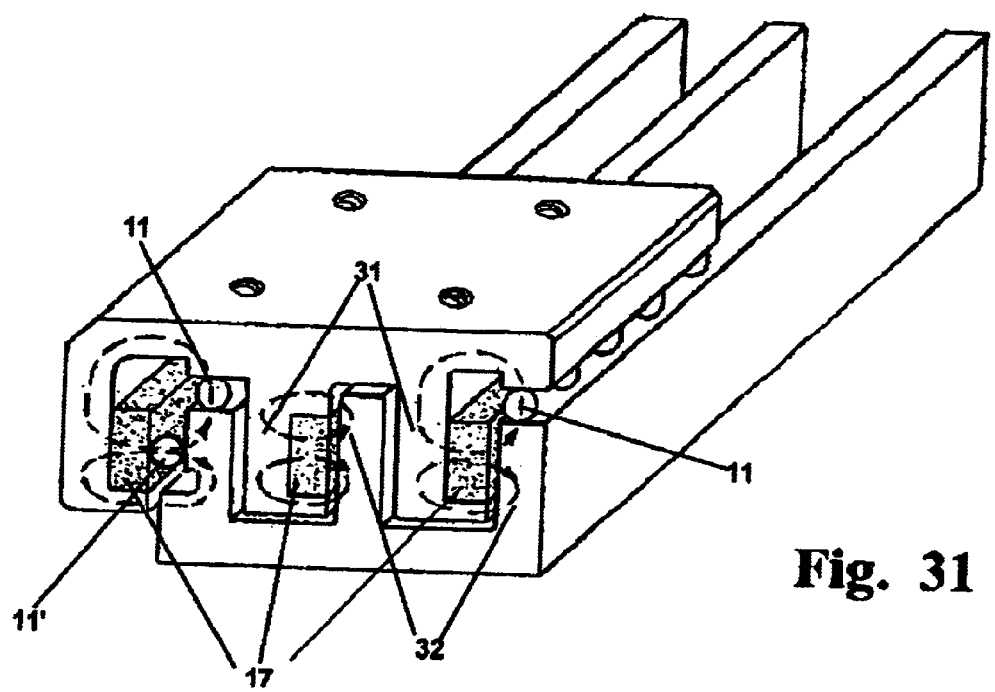
FIG. 31 is a perspective view of a device in accordance with yet other preferred embodiments of my invention and particularly incorporating multiple magnets interleaved to increase lateral holding force, shown in a long-displacement rectilinear table.

Tracking force and accuracy can be enhanced by adding further magnets in various sorts of stacking formations—as for example in plural vanes 31 (FIG. 31) which interleave with ferromagnetic vanes 32 in the opposite surface. Extra holding force may be particularly helpful with relatively long-travel riders.

Figure 32:
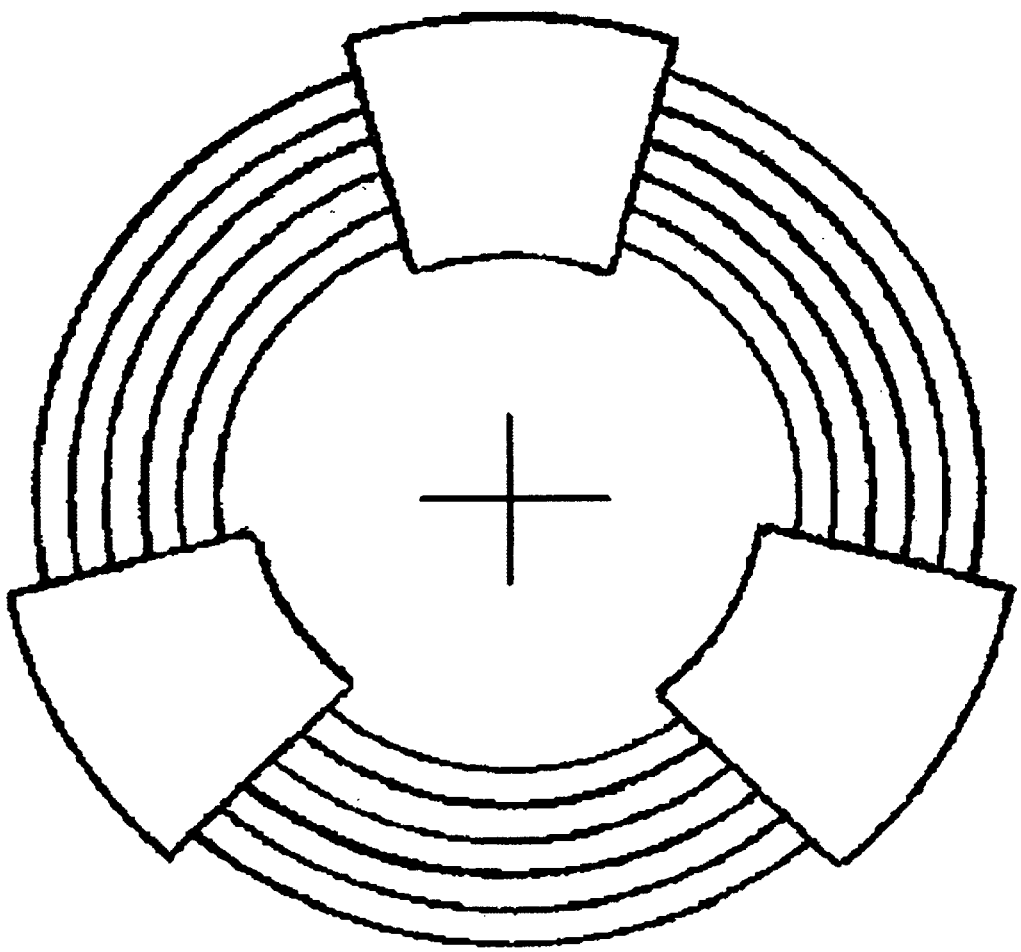
FIG. 32 is a plan of a rotary multitable apparatus in accordance with other preferred embodiments of my invention.
Figure 33:
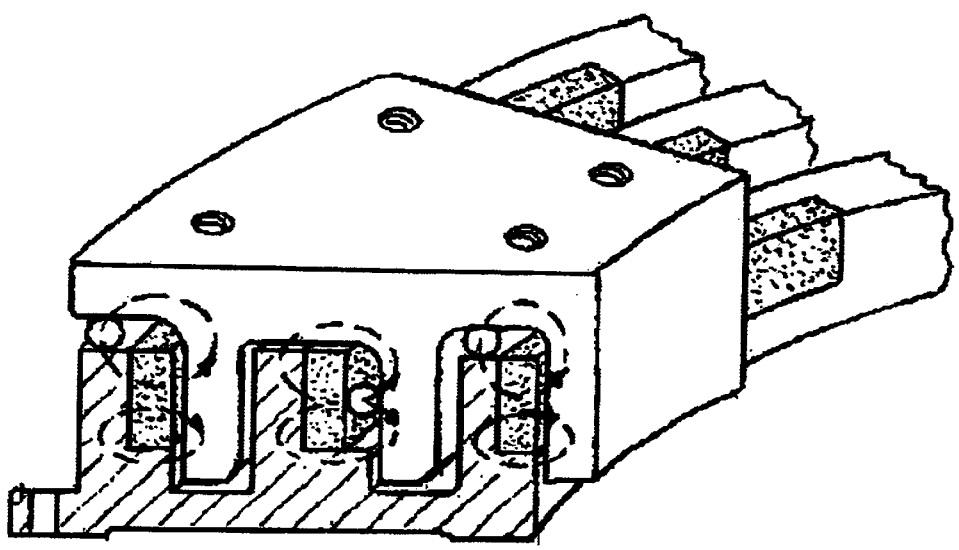
FIG. 33 is a perspective view, partly in section, of a device analogous to that in FIG. 31 but with curvilinear configuration for use in a rotary structure such as that of FIG. 32.

This is particularly so where multiple riders are provided on a common support (FIG. 32). Typically it is desired to mount interacting equipment on the different riders and to move them in and out of interacting position, to the most reproducible extent possible as regards their relative position to each other. Such arrangement compounds any imprecision in the basic positioning of a single rider.

6. PLURAL WOBBLE-ABSORBING MAGNETIC BEARINGS IN PARALLEL AS SUPPORTS

Figure 34:
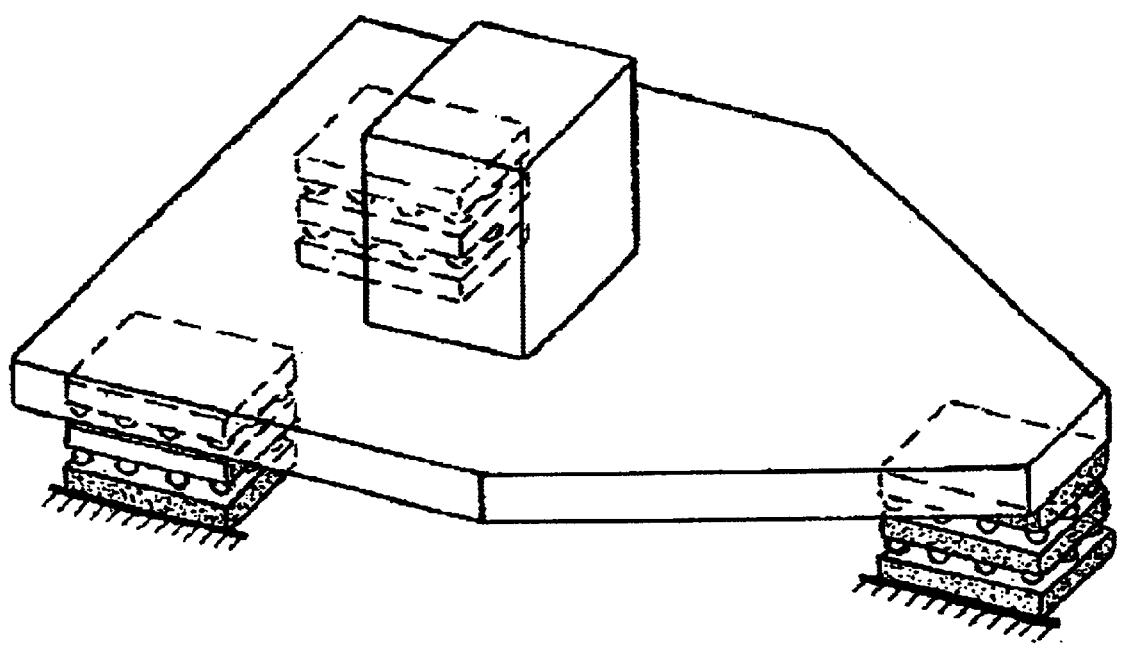
FIG. 34 is a perspective view of an instrument mounted stationarily, or for small movements, in accordance with still other preferred embodiments of my invention—and particularly incorporating use of plural universal wobble-absorbing magnetic bearings (herein "WAM" bearings or "WAMBs") that are part of my invention.
Figure 35:
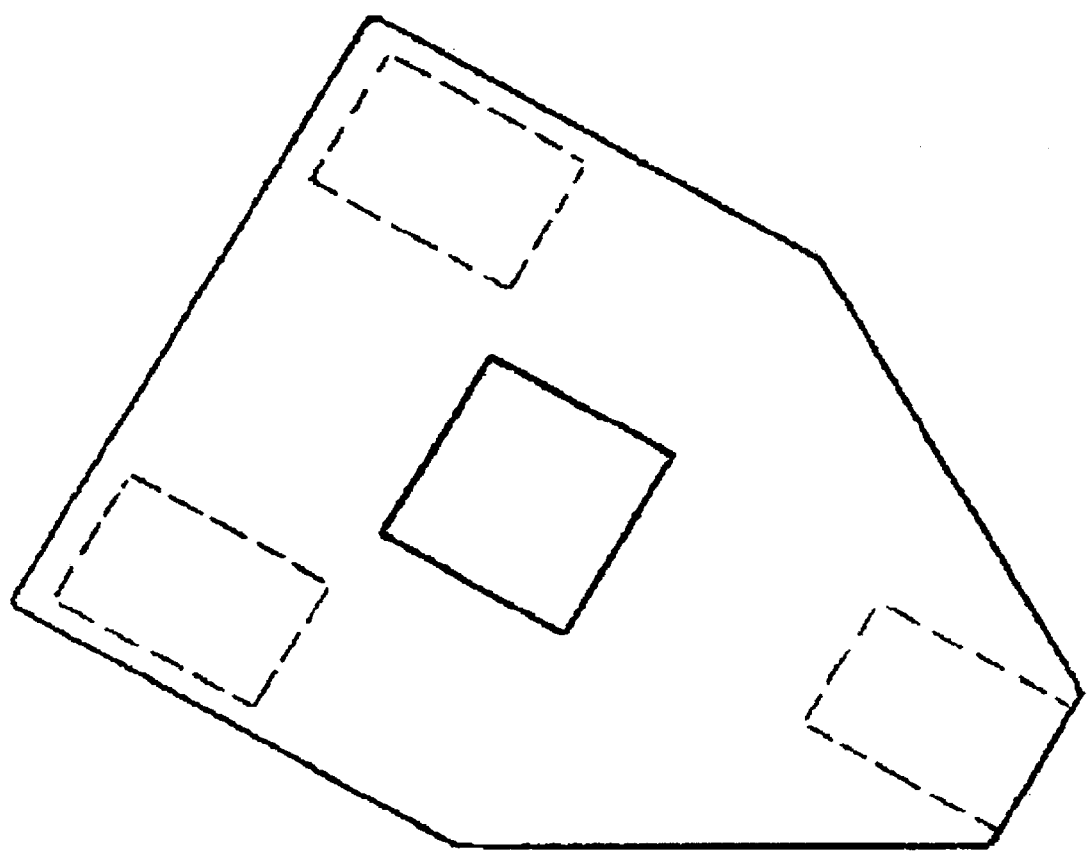
FIG. 35 is a plan showing disposition of the WAMBs on the underlying support surface of FIG. 35.

FIGS. 34 and 35 show how WAMBs can be used in an extended support-bearing environment. Here the objective is to support a relatively large object on a table, either stationarily or for very small displacements—but in any event very stably.

Three τ-WAMBs 10 of moderate size are spotted at the nominally horizontal interface between the object and support surface. The three WAMBs 10 should include spherical or crossed-cylindrical stages to accommodate anticipated angular imperfections at both sides of the mounting interface.

If it is desired to accommodate slightly larger displacements using the system of FIGS. 34 and 35, each WAMB may be assembled with several planar elements included—as will be more clear after study of the detailed sections which follow. Each of the planar-element pairs need then provide only a fraction of the total desired motion, since the overall assembly operates telescopically adding the contributions of each pair.

7. BASIC WOBBLE-ABSORBING MAGNETIC BEARINGS FOR USE IN PLURAL-SITE SUPPORT AND SMALL MOTIONS

In accordance with my invention a WAM bearing consists of at least two elements that move laterally with respect to each other and so permit lateral movement between attached modules—e.g., a support surface and an object upon it. The result is to isolate the object from the effects of imperfections in the surface. Only the desired support force is transmitted to the object, with no significant lateral displacement.

Balls between the pairs of bearing elements enable the lateral movement to be smooth and nearly frictionless. The WAM bearing is held together magnetically—as for example by making one or more of the elements a permanent magnet—so that the additional interfaces introduce no longitudinal backlash, and so that (with suitable sizing) the elements tend to keep themselves mutually in line.

For most applications I prefer to use a permanent magnet for one or more of the elements. As will be seen, however, the same overall results can be achieved by using a separate magnet to hold the WAM bearing together, or by using an electromagnet, or by using spherical magnets for balls, or by using combinations of these tactics. All these variations have advantages in various special situations as where size, weight, cost, and dynamic performance are critical.

A planar surface supplies two translational degrees of freedom to the connection between the surface and object: such a pair of elements suffices to accommodate purely linear elements of wobble. This is true even if the supported object is at a slight angle to the theoretical support direction.

In such situations, however, the true elevational position of the object diverges (even more slightly) from the nominal. For highest precision, independent position measurements and corrective action may be desirable—e.g., either closed-loop operation, or keeping track of the actual position and making allowance for it.

As mentioned earlier, a supported object and its supporting surface may be subject to spurious rotary mismatches too. To accommodate such mismatch, a WAM bearing is advantageously made with another pair of elements whose surfaces are curved about a common center—for instance, cylindrical elements, each providing one rotational degree of freedom to the connection between the surface and supported object.

Such rotary mismatch is often not in a controllable or even identifiable single plane. Consequently to accommodate most of the common sorts of drive-element imperfection, curved elements in some or many applications are better made spherical.

An alternative, however, is to use cylindrical elements with crossed axes. Either option supplies a total of two rotational degrees of freedom to the connection point.

In addition rotational mismatch can be about centers on either the object side or the surface side of the interface between surface and object. Where a designer can reasonably anticipate that such additional rotations may be likely, the designer should include additional curved surface pairs oriented appropriately. Such enhancement supplies one or two additional degrees of rotational freedom to the connection.

On the other hand, in some situations it is desirable to restrict the number of degrees of freedom at a support site, in such a way as to accomplish other objectives—but without impairing the wobble-absorbing character of the basic WAM bearing. In particular, transmission of torque τ through a support can be very important in drives, either to rotate a device on the driven side of the support interface or to hold a device (most commonly a nut) on that driven side so that it does not rotate relative to the equipment on that side.

My earlier patent documents cover some such torque-transmitting WAMBs. This present document introduces other torque-transmitting WAMBs, or τ-WAMBs—and some refinements of those earlier ones.

My invention contemplates commercial availability of a variety of complete WAM bearings—ranging from simple translation absorbers, or simple one-sided rotation absorbers, to devices with more degrees of freedom as will be shown below—and also WAMB components from which complete WAM bearings can be quickly and easily assembled, to suit many different circumstances.

8. BASIC CONFIGURATIONS OF WOBBLE-ABSORBING MAGNETIC BEARINGS

Extremely high magnetic force can be achieved by using a steel case that encloses the facing of the magnet, as well as the magnet itself, and that extends very close to the opposing steel-plate bearing surface. This configuration can be either annular or linear. The high force arises through tight coupling of the toroidal magnetic-flux path—by virtue of the fine airgap between the base of the steel case and the opposed steel plate. High force is desirable for two reasons:

It eliminates backlash very effectively. It also maintains—even during suspension from the bearing—the linkage between the support surface and supported (suspended) object.

The force can be made particularly high by using ferromagnetic balls, in which event preferably no retainer is included. With such material the magnetic flux is closed directly through the balls, and there is virtually no airgap under the annular magnet. The low airgap also minimizes magnetic-flux splash which may influence sensitive equipment nearby.

On the other hand only a limited amount of lateral (radial, in an annular device) motion can be accommodated in such a configuration before the interior of the case stops the balls (or retainer if present). Greater lateral travel is permitted by instead terminating the side walls of the case above the facing, and extending the facing laterally to cover the bottom of the case. The balls can now roll further laterally, but at the cost of a coarser airgap and correspondingly lower magnetic force, and greater flux leakage to the environment.

More elaborate configurations are possible, in which the balls can roll only under a peripheral (typically narrow) rim, rather than under a magnet. In a WAM bearing this does not present the dimensional difficulties discussed earlier in connection with tables as such. Since the balls do not roll on the magnet, it requires no facing. Such a configuration is best practiced with ferromagnetic balls, as these tend to hold themselves in place under the narrow rim.

Such devices can be either annular—with a toroidal-toroidal flux pattern (i.e., within each radial sector there is a toroidal pattern, which wraps toroidally around the centerline of the assembly)—or linear.

One advantageous configuration illustrated in my earlier patent documents is a steel-jacketed annular WAM bearing that can accommodate small lateral motions with a minimum of restoring force. This characteristic arises from providing an oversize (preferably by a factor of roughly 1.2 to 1.5) mating surface of one element relative to the other.

Restoring force between WAMB elements generally arises through edge effects as adjacent elements move out of mutual alignment. In the bearing just mentioned, the balls roll to their extreme radially outward or inward positions on the annular lower rim, before closely approaching either the outer edge of the significantly oversize element or the magnet within that oversize element at its center. Thus edge effects are not encountered.

The practical considerations of sheathing 14, ball-material, gap 16 and transverse motion outlined above and elsewhere in this document with respect to planar-surface configurations are applicable as well to curved surfaces such as the surfaces of curved elements. These practical consid- erations have been discussed with respect to relatively simple two-element WAM bearings but are equally applicable to multielement WAM assemblies such as will now be introduced.

9. COMPOUND WOBBLE-ABSORBING MAGNETIC BEARINGS WITH AND WITHOUT TORQUE TRANSMISSION

FIGS. 36 through 40 illustrate representative bearing assemblies for use in a variety of circumstances. They are made up of a relatively small number of standard elements, but through selection of these elements they can produce a customized WAM function to suit the situation at hand.

Figure 36:
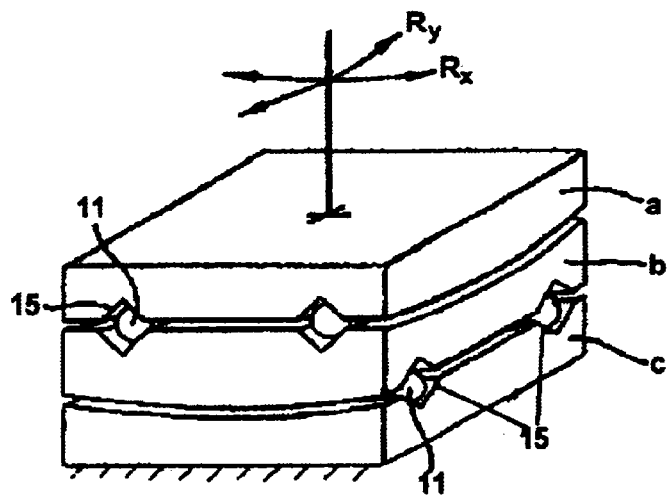
FIG. 36 is a perspective of one type of WAMB, according to certain preferred embodiments of my invention, which is usable in the mounting system of FIGS. 35 and 36.
Figure 37:
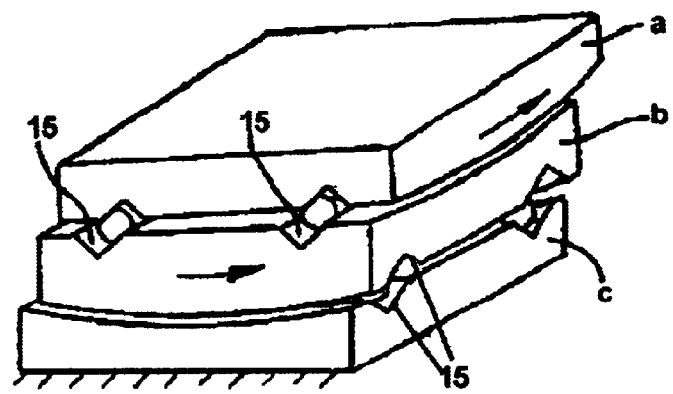
FIG. 37 is a like view of the same bearing with its several elements relatively displaced.
Figure 38:
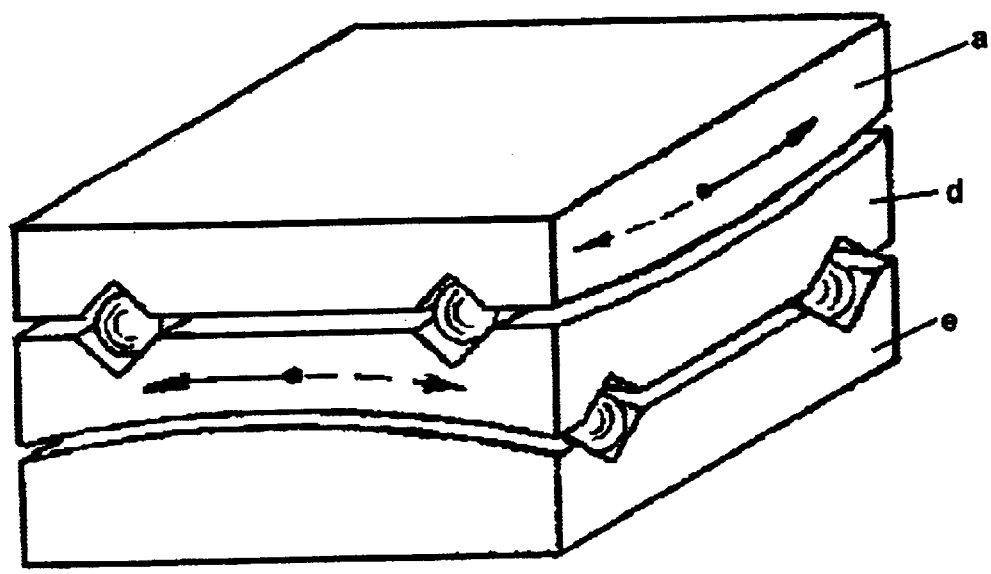
FIG. 38 is a like view of another type of WAM bearing.

FIGS. 36 and 37 show balls 11 riding between V-shaped grooves 15 formed in two pairs a-b, b-c of conformal cylindrical surfaces. As will be explained shortly, the grooves 15 may be regarded in a sense as optional; the balls could be clamped directly between the cylindrical surfaces.

The term "conformal" here means that each pair of cylinders has a respective common axis, though as can be seen the two axes of the two pairs are not common but crossed: the upper pair a-b accommodates relative rotation $R_Y$ about one vertical axis, and the lower pair b-c accommodates relative rotation $R_X$ about another horizontal axis.

Although the cylinder pairs are oriented with their cylindrical axes crossed, the axes are offset outside the bearing in a common direction (up, as drawn). Therefore these two interfaces, as suggested earlier, might substitute for a single spherical interface—but for the V grooves.

In the case of the particular configuration of FIGS. 36 and 37 as drawn, without the V grooves the performance would be nearly identical to performance using a spherical WAMB. A subtle but sometimes important difference, however, could be introduced by using different radii of curvature for the two cylinders, for the following reason.

A sphere-plus-plane combination or a cylinder-plus-plane combination (e.g., third and fourth elements g–h in FIG. 17) is particularly efficient in accommodating rotational wobble about some effective center of rotation whose distance from the bearing happens to equal the radius of curvature of the cylinder or sphere. All the motion is taken up in relative rotation of the spherical or cylindrical elements, and the planar elements idle unless there is transverse linear wobble too.

As the center of rotation of the wobble is assumed to be at distances progressively more-divergent from the WAMB radius, the planar stage must make a progressively increasing contribution—constantly rolling, through progressively larger amplitudes, back and forth in a sinusoidal fashion to absorb the increasing mismatch between the spherical radius and the actual distance to the effective pivot. The bearing will accept this operation, and the life of a WAM bearing is very long since it compensates (by magnetic attraction) for its own wear to a considerable extent.

Nevertheless this constant hunting—to provide a second-order but large-amplitude adjustment—may not be regarded as ideal, and system designers may wish to minimize it. (For example, as pointed out above, excursion amplitude does exert constraints on selection of rolling-element materials and sizes.)

Therefore if the effective pivot distance and orientation of the wobbling motion can be discovered (by calculation or measurement) before establishing a final WAMB configuration, it may be desirable to select a WAMB surface whose radius of curvature matches the effective pivot distance. In addition, if the choice is a cylindrical WAMB element pair the axis of the WAMB pair should be aligned (about the system longitudinal axis) with the major axis of the wobble.

Now it can be seen that if a designer expects, or finds, wobble in two different directions arising about two different effective pivot points at different distances from the bearing, the designer may prefer to try to match both distances, with two different WAMB surface pairs respectively. If the two lateral axes of the two wobble directions are not stable, or if they are at awkward angles to each other, two spherical WAMB sets in series could be used. If the two lateral axes are stable and crossed at 90°, however, the FIG. 36 combination could serve nicely—and would do better than a single sphere.

Such a WAMB would be somewhat more efficient than a sphere-plus-plane combination in relieving wobble in the two different directions, expected to arise about two effective pivot points at respectively different distances from the bearing, since the sphere-plus-plane combination would require constant back-and-forth rolling at the planar stage, in at least one direction, to absorb the mismatch between the spherical radius and the actual distance to the effective pivot.

10. TORQUE-TRANSMISSION FEATURES

As mentioned above, the V-grooves 15 may be considered as optional in a sense. They are important, however, when it is desired to transmit relatively high levels of torque through the WAMB sandwich.

Since the cylindrical axes of the two WAM-element pairs a-b and b-c in FIG. 36 are crossed, the cylindrical surfaces themselves are capable of transmitting torque, even without the V-grooves. This is explained at some length in my earlier patent documents, in conjunction with a crossed-cylinders combination in which the cylindrical axes are offset in opposite directions from the bearing—as in FIG. 38 of the present document. Furthermore a crossed-flanges configuration, particularly covered in my second above-discussed patent document, also can be used to transmit relatively high torque levels. Therefore all of these units alike may be regarded as τ-WAM or torque-transmitting wobble-absorbing magnetic bearings.

Relative to crossed cylinders, however, the V-groove forms of FIGS. 36 through 39 provide relatively much higher torque levels. Relative to crossed flanges, the V-groove forms offer a relatively more-compact geometry and more-symmetrical internal forces acting closer to the system axis (but in small quantities are more costly to make). Therefore the V-groove variants have distinct advantages over the other τ-WAMB devices.

Where V-grooves are formed in cylinders, as shown in FIGS. 36 through 39, the grooves may be seen as partly redundant relative to the cylinders: a groove running horizontally in the upper stage a-b in FIG. 36, for example, removes the same vertical-sliding degree of freedom as does the cylindrical surface of the right-hand stage b-c. The opposing V-groove surfaces in the left-hand interface, however, mutually engage at a steeper angle and so more effectively transmit large vertical forces than the shallowly angled cylindrical surfaces in the right-hand interface. Similar observations can be made for the other V-grooves and cylinders in the drawing, relative to horizontal forces.

As to V-grooves in planar-surface interfaces, naturally the grooves limit degrees of freedom in a way which cannot be achieved at all with planar surfaces normal to the drive axis. Thus V-grooves in the planar interfaces g-h and h-i in FIG. 39 enable torque transmission comparable to that obtained with the crossed-flanges configuration covered in my second above-mentioned patent document.

Figure 39:
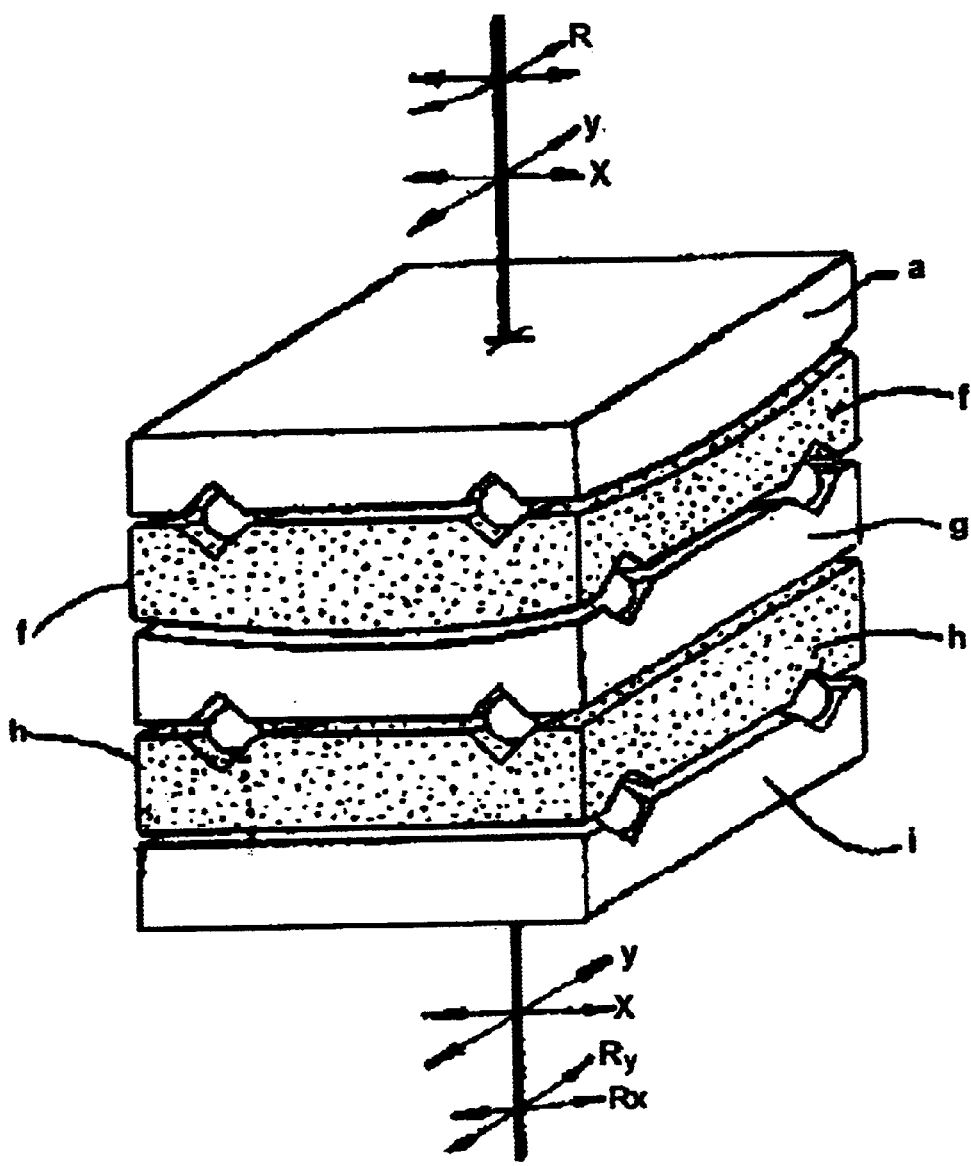
FIG. 39 is a like view of yet another WAMB, particularly drawn to emphasize the self-magnetic character of preferred forms of these devices.

V-grooves are not the only means of imparting higher torque-carrying capability to crossed-cylinder WAMB sets. A ball-separated tongue-and-groove form (not shown) can be substituted.

Where centers of rotational wobble are thought to exist at both sides of the WAMB, two spheres centered at the two sides can be provided. If a τ-WAMB is desired, spheres cannot be used but two crossed-cylinder pairs can be employed instead—with the curvatures of the two pairs centered respectively above and below the WAMB as in FIG. 38. FIG. 39 shows a τ-WAMB with both planar and cylindrical faces.

11. SIMPLE EXTERNAL MAGNETS IMPARTING OR AUGMENTING MAGNETIC FORCE

Some benefits of my invention may be obtained, in some circumstances, even using bearings that were made without recognition of the benefits of my invention. For instance a completely conventional bearing can be clamped by a magnetic overall-enclosure clamp or bearing house, compressing all the ball contact points to eliminate backlash and obtain many of the advantages of the instant invention.

Such a bearing itself typically has no magnetic features whatever, but acquires key characteristics of my invention when so constrained magnetically. In interests of both manufacturing simplicity and modularity, however, I prefer to provide such an assembly (FIG. 40) with parts formed according to my invention—either with or without magnetic features as preferred—and apply the clamping house 16 to compress the several stages together. If the clamping house 16 is used with a WAMB that does have magnetic features, the result can be to augment the magnetic forces already present.

The WAMBs of FIGS. 36 through 40 are drawn with square external shape for, primarily, clarity of illustration. Actually all the elements of these drawings can be made cylindrical in overall external shape as desired.

Figure 40:
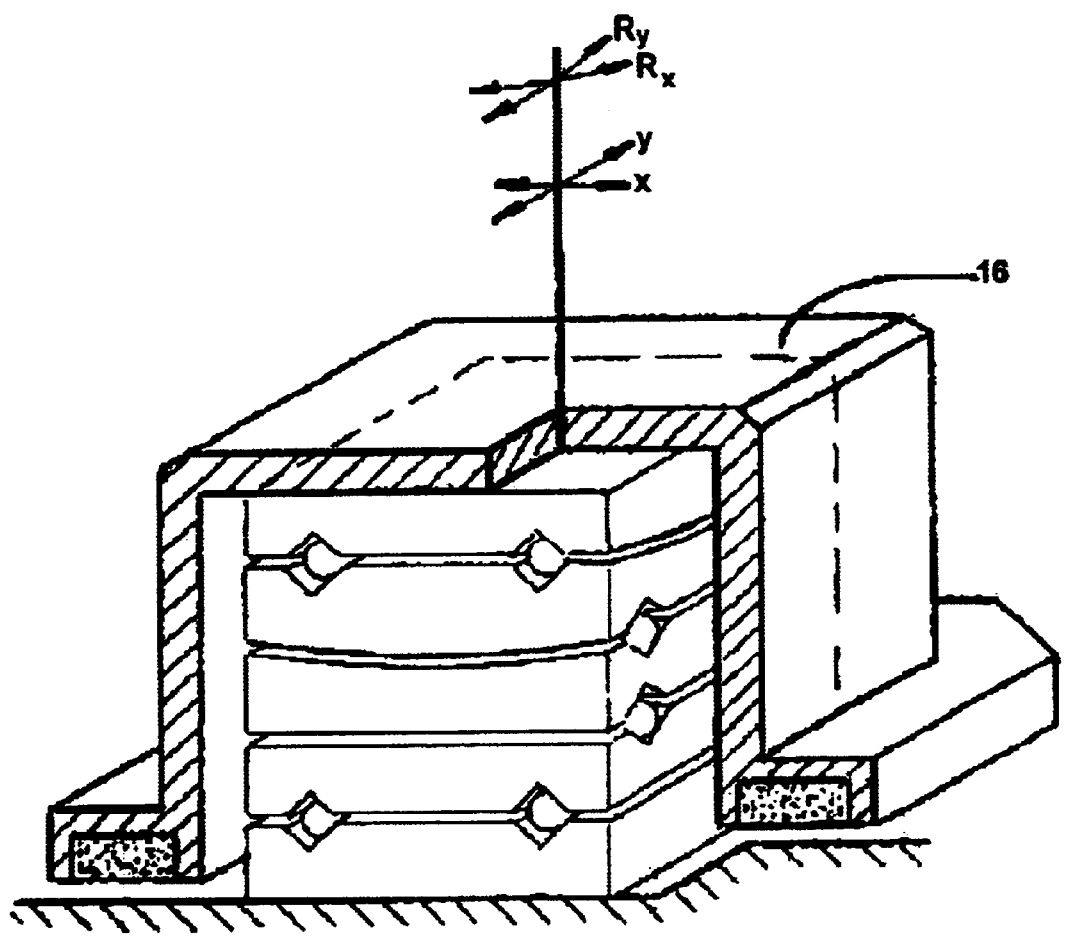
FIG. 40 is a like view of a structure similar or identical to the FIG. 39 WAMB but in combination with an external bearing house—drawn broken away and partly in section—that magnetically clamps the structure to an engagement surface to augment or substitute for magnetic forces within the WAMB.

Either end of any of these assemblies can be mounted to an extended transverse surface as at the bottom in FIGS. 36, 37 and 40, or through attachment of a suitable bar etc.

12. PERMANENT-MAGNET BALLS AND ROLLERS

Figure 41:
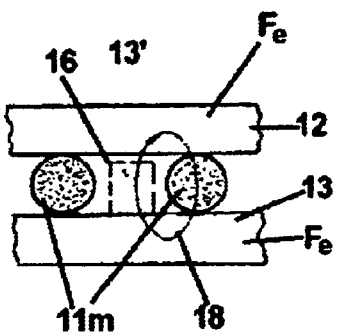
FIG. 41 is an elevation showing a portion of a table, which may be a WAMB, employing balls or rollers that are permanent magnets in accordance with further preferred embodiments of my invention.

FIG. 41 shows that a basic WAMB element can be made using ferromagnetic surface elements 12, 13 held tightly together by a magnetic field 18 which is produced by a permanent magnet 11m in the form of a cylinder or a spherical ball. Here the balls or cylinders 11m clamp the two surfaces 12, 13 to themselves (i.e., to the balls or cylinders themselves), rather than being clamped between the surfaces.

If desired the flux can be concentrated and a finer airgap 16 formed by adding a metal step 13' to one surface element 13; the step can be in the center of the assembly as shown, or steps can be provided near the ends, etc.

Some limitations of permanently magnetized rolling elements are set forth in the next section of this document. Such elements if made of ceramic are particularly desirable in configurations favoring their extreme hardness, longevity, high-temperature compatibility, and corrosion resistance—but permanent magnets in general are not suited to applications with long travel.

Figure 42:
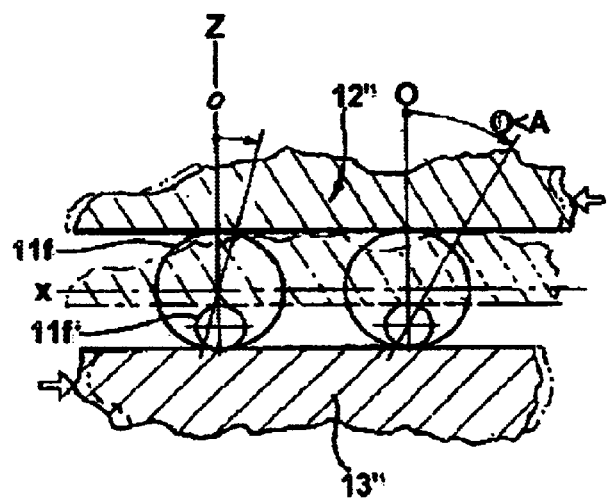
FIG. 42 is a diagram suggesting magnetic force relationships among rolling elements and opposing surfaces, where the surfaces and rolling elements are firmly held together.

13. MAGNETIC INDUCTION CONSIDERATIONS AND CHOICE OF ROLLING-ELEMENT MATERIALS (a) Pole induction—When ferromagnetic rolling elements 11$f$ or 11$f'$—either balls or cylinders—are clamped between two magnets, or between two surfaces one 12" of which is magnetized and the other 13" of which is ferromagnetic, magnetic domains tend to be induced in the rolling elements 11$f$, 11$f'$—which thereby tend to become magnets themselves. In other words, magnetic poles S and N (FIG. 42) in the adjacent clamping surfaces 12", 13" tend to induce magnetic poles N' and S' respectively in the rolling elements 11$f$, 11$f'$. As shown, the induced poles N', S' are aligned with the surface normals, identified in FIG. 42 as the z axis.

If the rolling elements 11$f$, 11$f'$ are already magnets, then an analogous situation may arise in the opposite sequence: when first placed on either adjacent surface (say the lower one in FIG. 42), the rolling elements mechanically, bodily align themselves with their poles parallel to the z axis. Then small magnetized pole areas N or S (depending on alignment of the rolling-element magnets) tend to be induced in the adjacent surface by magnetic flux from the poles S' or N' of the rolling elements. Then when the other clamping surface is positioned (say the upper one in FIG. 42) in contact with the rolling elements, poles S or N tend to be induced in that surface too.

(b) Force variations that result from rolling—Now as the surfaces undergo relative motion x (FIG. 42) and the rolling elements actually begin to roll, the induced or permanent poles in the rolling elements 11$f$, 11$f'$ roll (or in part "rotate") out of alignment with the z axis. The result is to tend to weaken, at least temporarily, the magnetic clamping of the two clamping surfaces.

(c) Eddy currents—If the rolling elements are soft ferromagnetic material the magnetic domains can realign themselves relatively quickly, and the clamping force may not be significantly reduced unless the motion is extremely rapid. Nevertheless there is an adverse effect: eddy currents associated with the changing flux and domain directions heat the rolling elements, which heat the adjacent surfaces.

As a result both the rolling devices and clamping surfaces become subject to dimensional changes, which may be differential as these various phenomena are sensitive to edge effects and other geometrical influences. The heating and dimensional shifts can degrade positional precision.

Therefore in situations where lateral motion is expected to be relatively very constant or rapid, or both constant and rapid, it is advisable to calculate or experimentally determine the eddy-current induction and thermal effects expected, and adjust dimensions and tolerances accordingly. In extreme cases it will be preferable to avoid all these effects by using rolling elements of nonmagnetic materials such as ordinary ceramic—with a retainer to keep the rolling elements in position. Nonmagnetic ceramic rolling elements are now available with remarkably high fracture resistance.

Since the Norris bearing used magnetic elements merely to hold the balls in position without a spacer or retainer, and this function can be performed only if the balls are of ferromagnetic material, i.e. material with a significantly high magnetic permeability, my inventions represent the first known magnetic bearing that can use nonferromagnetic balls.

Figure 43:
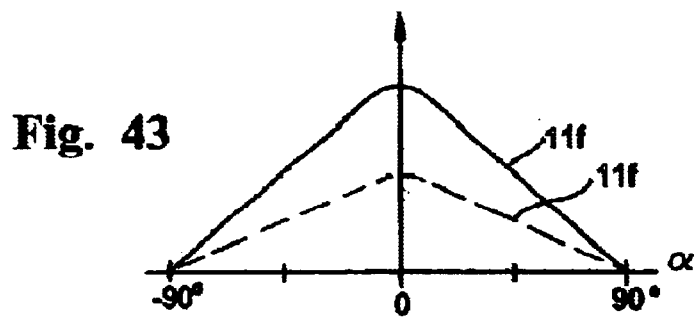
FIG. 43 is a graph of normal-force relationships in an assembly such as that of FIG. 42.

If the rolling elements are instead relatively hard ferromagnetic material, then clamping force tends to decrease significantly with rolling angle α (FIG. 43) away from the z axis as shown. Only if the rolling speed is extremely slow, or total angular excursion α does not exceed perhaps some 70°, can the magnetic induction effects be kept small enough to maintain adequate magnetic clamping. For any given lateral displacement x, the rotational component $α_A$ of motion, during rolling, for a larger ball 11$f$ is smaller than the corresponding rotational component $α_B$ for a smaller ball 11$f'$—and therefore is less subject to loss of clamping strength through misalignment in rolling.

Moreover even a moderate speed of rolling, with these harder materials, is likely to produce excessive heating as the rolling elements electrically resists realignment of their magnetic domains. Hence for these various reasons harder materials are to be avoided where significant motional amplitude or velocity are expected, though they are otherwise preferable for the greater clamping forces and flux-splash control which they confer on a WAM assembly.

Proceeding onward along the spectrum of soft to hard initially-unmagnetized but ferromagnetic materials and now to assemblies using permanent metal magnets as the rolling elements: as will be understood from the foregoing discussion, if permanent magnets are in use the system parameters must be selected to strictly limit rolling angular excursion well below 90°, lest clamping force be lost entirely. Even within this constraint if relatively high motional amplitude or speed arises odd effects may follow as the rolling-element magnets generate eddy currents and induced magnetic forces tending to resist the motion.

(d) Ceramic ball magnets—Some relief from limitations related to heating may be obtained using ceramic magnetic rolling elements, as these are less susceptible to passage of eddy currents and resulting ohmic heating. Ceramic balls and rollers, however, like ceramic pole magnets are subject to cracking if dynamically overloaded.

Ceramic magnetic rollers can be shrink-fitted with steel jackets to minimize this problem, though at some expense. Ceramic magnetic balls, however, as a general rule should be reserved for very delicate or specialized equipment in which they can be protected from abrupt stress—and in which their special compactness, mechanical hardness, chemical properties and the like are particularly helpful.

14. OVERTRAVEL IN A MAGNETICALLY STABILIZED STAGE

Often the desired longitudinal travel of a stage or other object to be driven along a support surface greatly exceeds any desired length of the stage. Excursions are typically limited by the distance which the balls can roll before rolling off, or rolling out from under, the end of an element, or running into a wall at the end of an element.

Overtravel of course could be accommodated by using conventional recirculating-ball devices which are available commercially, but these have relatively high energy consumption due to friction of the balls in the recirculating track. Undesired frictional heating can degrade the dimensional stability of the entire apparatus.

Accordingly my invention contemplates another way of enabling overtravel that entails very little heating—and that is applicable in many other types of systems requiring overtravel. As shown in FIGS. 44 through 47, the stage 810" terminates in a surface which rolls on ferromagnetic (but not necessarily magnetized) balls 11, and these balls in turn roll along the support surface or guide track 617.

Figure 44:
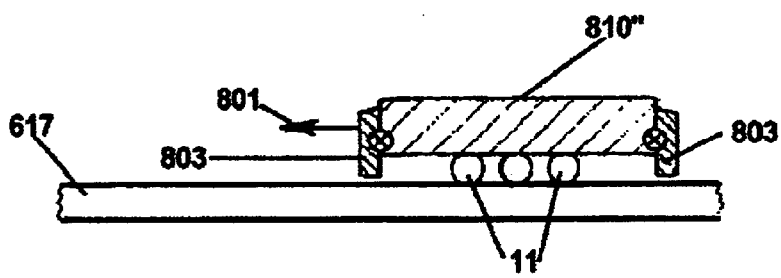
FIG. 44 is a schematic side elevation of an overtravel system, illustrated at an initial phase of a related overtravel method, that form another preferred embodiment of my invention.
Figure 45:
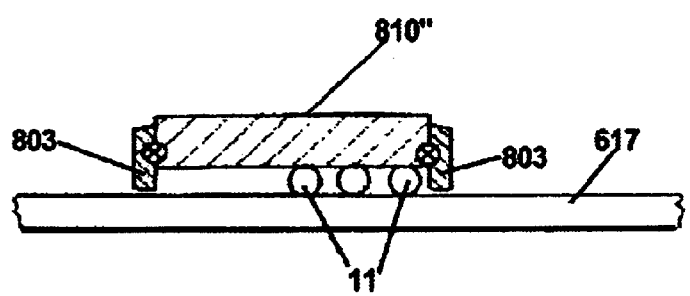
FIG. 45 is a like view of the same system at a subsequent phase of the method.
Figure 46:
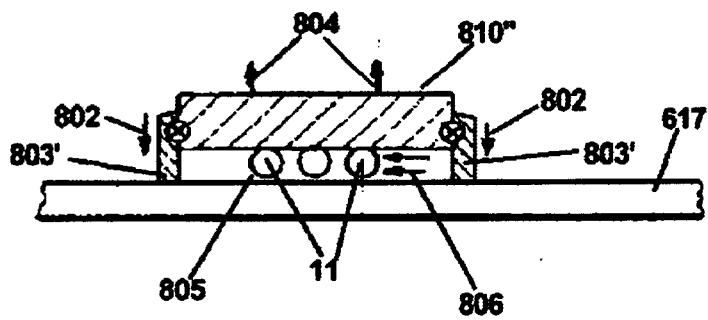
FIG. 46 is a like view at yet a later phase.
Figure 47:
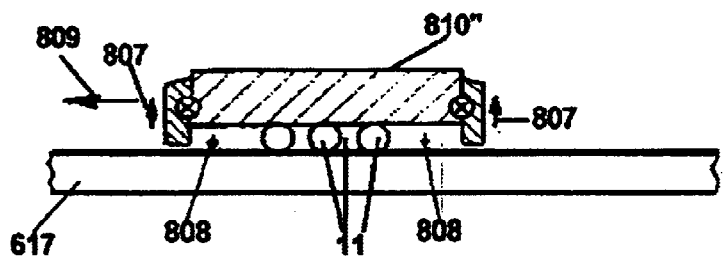
FIG. 47 is a like view of a still-later phase in which the system is beginning iteration of the already-illustrated phases.

From its starting position in FIG. 44 the stage 810" is assumed to be moving leftward as indicated by the arrow 801. In FIG. 45 the device is seen to have moved nearly as far as it can, since the right end of the stage 810" has nearly reached the rightmost one of the balls 11.

At roughly this point the device is stopped, and two end jacks 803 are lowered 802 (FIG. 46) into contact with the track 617 or, to avoid damaging the track, into contact with a separate supporting-surface strip (not shown) paralleling the track. The jacks 803 are then advanced still further downward relative to the stage 810", with the effect of raising 804 the stage—and with it the balls 11—very slightly relative to the track 617.

In FIG. 39 the result is exaggerated by showing of a distinct gap 805 between the balls 11 and track 617. Actually it is only necessary to raise the stage enough to remove friction (and avoid scratching the balls or facing surfaces). As soon as friction is relieved, the balls 11 will move 806 to recenter themselves in the magnetic field of the penultimate surface of the stage 810".

The jacks 803 are then retracted upward 807, lowering 808 the stage 810" and balls 11 back into contact with the track 617, and the device is ready to proceed leftward in another incremental advance.

15. ROLLER-BEARING SUSPENSION

Figure 48:
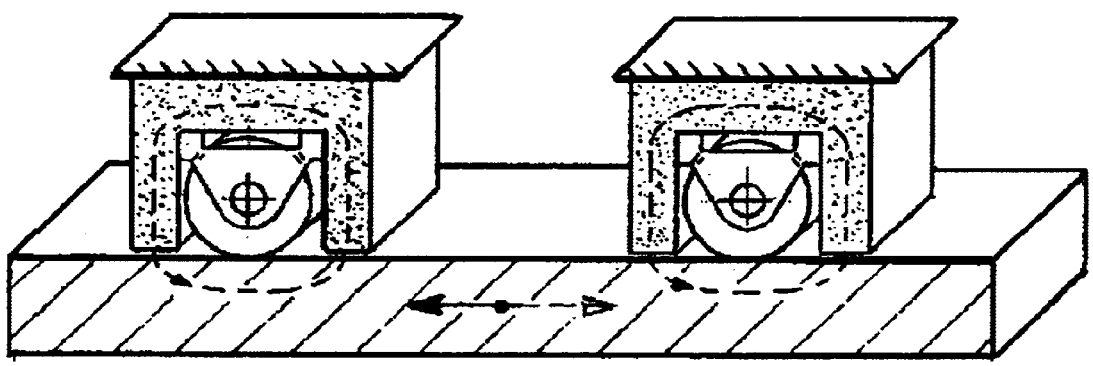
FIG. 48 is a perspective view of a magnetically constrained roller-bearing table mechanism.

FIG. 48 illustrates a system in which two roller bearings are used for movably suspending a large object. For relatively rapid motion it is desirable that the roller bearings have ceramic rollers.

The two roller bearings and also two large C magnets are all supported above the object. The object is either ferromagnetic or fixed along its upper surface to a ferromagnetic plate.

The object is raised into contact with the roller bearings and firmly clamped against the roller bearings by the magnets. By virtue of the nonmagnetic (ceramic) rollers in the bearings the object can be moved rapidly without generation of eddy currents that would otherwise impede the motion.

16. CONCLUSION

Many other modifications may be made by combining various ones of the features illustrated herein, and there are also modifications which will be evident from the described concepts of the invention.

The invention has been disclosed in detail in order to comply with the requirements of the patent laws. The scope of the invention, however, is to be measured only in accordance with the appended claims.

I claim:

1. A precision moving table system for transverse translation and comprising:

first and second relatively movable table members, the first member supporting the second member at respective opposing surfaces of the members, at least one of said members comprising a magnet; and a first set of rolling elements held firmly, by magnetic force developed by the magnet, between the opposing surfaces of the members for fully rolling motion along both members to support the second member in transverse translation;

wherein at least some of the rolling elements roll along the magnet.

2. The table system of claim 1, wherein:

said at least some rolling elements roll directly along a surface of the magnet.

3. A precision moving table system for transverse translation and comprising:

first and second relatively movable table members, the first member supporting the second member at respective opposing surfaces of the members, at least one of said members comprising a magnet; and a first set of rolling elements held firmly, by magnetic force developed by the magnet, between the opposing surfaces of the members for fully rolling motion along both members to support the second member in transverse translation; wherein:

at least some of the rolling elements roll along the magnet; and said members and rolling elements are configured for said transverse translation through a practically useful distance.

4. A precision moving table system for transverse translation and comprising:

first and second relatively movable table members, the first member supporting the second member at respective opposing surfaces of the members, at least one of said members comprising a magnet; and a first set of rolling elements held firmly, by magnetic force developed by the magnet, between the opposing surfaces of the members for fully rolling motion along both members to support the second member in transverse translation; wherein:

at least some of the rolling elements roll along the magnet; and one of the table members is distinctly longer than a second of the table members, along a direction of the transverse translation.

5. A precision moving table system for transverse translation and comprising:

first and second relatively movable table members, the first member supporting the second member at respective opposing surfaces of the members, at least one of said members comprising a magnet; and a first set of rolling elements held firmly, by magnetic force developed by the magnet, between the opposing surfaces of the members for fully rolling motion along both members to support the second member in transverse translation; wherein:

at least some of the rolling elements roll along the magnet; and one of the table members is at least 1.2 times longer than a second of the table members, along a direction of the transverse translation.

6. A precision moving table system for constrained transverse translational motion and comprising:

first and second relatively movable table members, the first member supporting the second member at respective opposing surfaces of the members, at least one of said members comprising a magnet;

a first set of rolling elements held firmly, by magnetic force developed by the magnet, between the opposing surfaces of the members for fully rolling motion along both members to support the second member in transverse translation; and a first transverse guide surface fixed to one member and engaging the other member to constrain transverse relative motion of the members;

wherein at least some of the rolling elements roll along the magnet.

7. The system of claim 6, further comprising:

a second set of rolling elements held by magnetic force between the guide surface and the engaged member, for fully rolling motion along both the guide surface and guided member.

8. The system of claim 7, further comprising:
a third table member, movable relative to said second member and forming therewith a member pair, and supported by said second member at respective facing surfaces;
a third set of rolling elements held firmly by magnetic force for rolling motion along both facing surfaces; and
a second guide surface fixed to one member of said pair and engaging the other member of said pair to constrain their transverse relative motion.

9. The system of claim 8, wherein:
at least two of said members comprise no magnet.

10. The system of claim 8, wherein:
the second guide surface comprises a groove, formed in one member of said pair and forming one of said facing surfaces; and
the third set of rolling elements rolls along the groove and rolls along said other member of said pair, supporting the third member and constraining transverse relative motion of said pair.

11. The system of claim 8:
wherein the third set of rolling elements is held for fully rolling motion along both facing surfaces;
wherein the second guide surface comprises a wall, projecting from the first or third member; and
further comprising a fourth set of rolling elements held by magnetic force between, and fully rolling along both, the second guide surface and said other member of said pair.

12. The system of claim 11, wherein the second table member comprises:
generally along one edge a downstanding wall forming the first guide surface and engaging the first member through the second set of elements;
generally along another edge an upstanding wall forming the second guide surface and guiding the third member through the fourth set of elements.

13. The system of claim 12, further comprising:
a fourth table member supported on the third member, at mutually facing surfaces, and forming therewith a further pair of members;
a groove formed in one member of the further pair and opposing a facing surface of the other member of the further pair;
a fifth set of magnetically held elements rolling along the groove and also rolling along the facing surface of said other member of the further pair.

14. The system of claim 12, wherein:
said at least one of the members that comprises a magnet is the second member.

15. The moving table system of claim 1, further comprising:
a third table member relatively movable with respect to each of the first and second members, each of the three members being mounted to at least one adjacent member, in a series;
the first and third of said members comprising no magnet; and
the second member being positioned in the series directly between said first and third members, and comprising a magnet; and wherein:
magnetic force developed by the magnet holds the rolling elements firmly for fully rolling motion along all three of said members:
some of the rolling elements being held between the first and second members, and
some of the rolling elements being held between the second and third members; and
at least some of the rolling elements fully roll along the magnet.

16. A moving table system comprising:
relatively movable table members, at least one of said members comprising a magnet;
a first one of said members defining a pair of interfaces, each interface being shaped and oriented for constraining relative movement between the members with regard to at least one direction of motion respectively;
a second one of said members shaped and disposed to fit at said interfaces; and
rolling elements held firmly, by magnetic force developed by the at least one magnet, between the members at both interfaces, for fully rolling motion along both members at both interfaces.

17. The table system of claim 16, wherein:
continuous magnetic flux lines from the at least one magnet pass through, in common, both members and at least some of the rolling elements at each of the two interfaces.

18. The table system of claim 16, wherein:
both of said interfaces are substantially planar.

19. The table system of claim 16, wherein:
one of said interfaces is substantially planar;
the other of said interfaces is curved.

20. The table system of claim 16, wherein:
both of said interfaces are curved.

21. The system of claim 16, wherein:
the interfaces of the pair are mutually angled to form an interface corner; and
the second one of said members fits at the corner.

22. A precision moving table system for transverse translation and comprising:
relatively movable table members, at least one of said members comprising a magnet; and
at least one series of rolling elements held firmly, by magnetic force developed by the magnet, along a path between the members; wherein:
magnetic flux passes directly through the rolling elements of the series to complete a magnetic circuit; and
the rolling elements occupy fifty to ninety-five percent of the distance along the rolling-element path.

23. The system of claim 22, wherein:
the table system is configured for transverse translation; and
the table members undergo relative transverse translation along the rolling elements.

24. The system of claim 22, wherein:
said members and rolling elements are configured for said transverse translation through a practically useful distance.

25. The system of claim 22, wherein:
one of the table members is distinctly longer,than a second of the table members, along a direction of the transverse translation.

26. The system of claim 22, wherein:
one of the table members is at least 1.2 times longer than a second of the table members, along a direction of the transverse translation.

27. The system of claim 22, for constrained transverse motion and further comprising:

a transverse guide surface fixed to one member and engaging another member to constrain transverse relative motion of the members.

28. The system of claim 27, wherein:

some of the rolling elements are held by magnetic force between the guide surface and the engaged member, for rolling motion along both the guide surface and guided member.

29. The system of claim 28, wherein:

one of the table members is distinctly longer than a second of the table members, along a direction of the transverse translation.

30. The system of claim 22, wherein:

the rolling elements occupy at least seventy percent of the distance along the rolling-element path.

* * * * *